(12) United States Patent　　(10) Patent No.: US 8,167,438 B2
Yamauchi et al.　　(45) Date of Patent: May 1, 2012

(54) LIGHT SOURCE DEVICE, PROJECTOR, AND DRIVING METHOD OF DISCHARGE LAMP

(75) Inventors: Kentaro Yamauchi, Ashiya (JP); Tetsuo Terashima, Chino (JP); Takeshi Takezawa, Matsumoto (JP); Kazuo Okawa, Matsumoto (JP); Shigeyasu Soma, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 444 days.

(21) Appl. No.: 12/314,181

(22) Filed: Dec. 5, 2008

(65) Prior Publication Data

US 2009/0153806 A1　　Jun. 18, 2009

(30) Foreign Application Priority Data

Dec. 14, 2007　(JP) ................................ 2007-322927
Dec. 18, 2007　(JP) ................................ 2007-325592
Aug. 7, 2008　(JP) ................................ 2008-204658
Aug. 7, 2008　(JP) ................................ 2008-204681

(51) Int. Cl.
　　*G03B 21/28*　　(2006.01)
　　*H05B 41/14*　　(2006.01)
(52) U.S. Cl. ......................................... 353/85; 315/287
(58) Field of Classification Search ................... 353/85, 353/98, 99; 315/209 R, 224, 225, 228, 246, 315/287, 294, 307, 308
See application file for complete search history.

(56) References Cited

U.S. PATENT DOCUMENTS 6,646,392 B2　11/2003　Slegers
(Continued)

FOREIGN PATENT DOCUMENTS

CN　　101018440 A　　8/2007
(Continued)

OTHER PUBLICATIONS

Raiser, Franz—Institute of Electrical and Electronics Engineers, "Problems with lamp current control using a PWM signal," Conference Record of the 2001 IEEE Industry Applications Conference—36th IAS Annual Meeting—Chicago, IL, Conference Record of the IEEE Industry Applications Conference. IAS Meeting, vol. 1, pp. 499-503, Sep. 30, 2001.

(Continued)

*Primary Examiner* — William C Dowling
(74) *Attorney, Agent, or Firm* — Oliff & Berridge, PLC

(57) ABSTRACT

A light source device is provided. The light source device has: a discharge lamp that emits light by discharge in an interelectrode space between a first electrode and a second electrode; a main mirror arranged at the first electrode side that reflects light flux generated by the discharge in the interelectrode space so as to emit the light flux to an area to be illuminated; a sub-mirror arranged at the second electrode side facing opposite the main mirror that reflects the light flux from the interelectrode space toward the interelectrode space; and a driver that supplies alternating current to the first and the second electrodes, and changes duty ratio of the alternating current supplied to the first and the second electrodes in accordance with a predetermined pattern. In the light source device, maximum value of time ratio of a first anode period in which the first electrode works as anode to one cycle of the alternating current is larger than maximum value of time ratio of a second anode period in which the second electrode works as anode to the one cycle of the alternating current.

10 Claims, 15 Drawing Sheets

U.S. PATENT DOCUMENTS

| | | | |
|---|---|---|---|
| 6,815,907 B2 | 11/2004 | Riederer | |
| 6,975,077 B2 | 12/2005 | Izumi et al. | |
| 7,052,141 B2 | 5/2006 | Akiyama | |
| 7,122,960 B2 | 10/2006 | Tukamoto et al. | |
| 7,274,157 B2 | 9/2007 | Hirata et al. | |
| 7,288,899 B2 | 10/2007 | Akiyama | |
| 7,446,482 B2* | 11/2008 | Sugaya | 315/200 R |
| 7,511,432 B2 | 3/2009 | Watanabe et al. | |
| 7,511,433 B2 | 3/2009 | Okawa | |
| 7,549,771 B2* | 6/2009 | Yamauchi et al. | 362/264 |
| 7,733,029 B2 | 6/2010 | Kikuchi | |
| 7,768,211 B2 | 8/2010 | Deppe et al. | |
| 7,800,314 B2* | 9/2010 | Yamauchi et al. | 315/287 |
| 7,855,512 B2 | 12/2010 | Ozasa et al. | |
| 7,909,473 B2 | 3/2011 | Deppe | |
| 7,923,940 B2 | 4/2011 | Okawa | |
| 2002/0011803 A1 | 1/2002 | Derra et al. | |
| 2003/0111969 A1 | 6/2003 | Konishi et al. | |
| 2005/0082986 A1 | 4/2005 | Takezawa et al. | |
| 2007/0189016 A1 | 8/2007 | Yamauchi et al. | |
| 2007/0228996 A1 | 10/2007 | Sugaya | |
| 2009/0153073 A1* | 6/2009 | Yamauchi et al. | 315/291 |
| 2009/0212711 A1* | 8/2009 | Terashima et al. | 315/209 R |
| 2009/0212714 A1* | 8/2009 | Terashima et al. | 315/287 |
| 2009/0218955 A1* | 9/2009 | Takezawa et al. | 315/287 |
| 2009/0231553 A1* | 9/2009 | Tanaka et al. | 353/85 |
| 2009/0236998 A1* | 9/2009 | Terashima et al. | 315/209 R |
| 2009/0237623 A1* | 9/2009 | Yamauchi | 353/85 |
| 2009/0237624 A1* | 9/2009 | Soma et al. | 353/85 |
| 2009/0237625 A1* | 9/2009 | Yamauchi | 353/85 |
| 2010/0033103 A1* | 2/2010 | Kimura et al. | 315/246 |
| 2010/0033105 A1* | 2/2010 | Yamauchi et al. | 315/287 |
| 2010/0084987 A1* | 4/2010 | Yamauchi et al. | 315/224 |
| 2010/0134033 A1* | 6/2010 | Terashima et al. | 315/246 |
| 2010/0148682 A1* | 6/2010 | Yamauchi et al. | 315/209 R |
| 2010/0156313 A1* | 6/2010 | Terashima et al. | 315/291 |
| 2010/0238418 A1* | 9/2010 | Soma et al. | 353/85 |

FOREIGN PATENT DOCUMENTS

| | | |
|---|---|---|
| EP | 1 410 695 B1 | 6/2006 |
| EP | 1 718 129 A1 | 11/2006 |
| JP | A-2004-525496 | 8/2004 |
| JP | 2006-004919 | 1/2006 |
| JP | A-2006-004919 | 1/2006 |
| JP | 2006-032017 | 2/2006 |
| JP | A-2006-032017 | 2/2006 |
| WO | WO 2004/066687 A1 | 8/2004 |

OTHER PUBLICATIONS

Hsieh, Guan-Chyun, et al., "Group Asymmetrical PWM Controller for Dimmable Fluorescent Lamp Ballast without Striation and Thermostat Effect," Industrial Electronics Society, 2005, pp. 792-797.

European Search Report issued in European Patent Application No. EP 08171250.7, dated Mar. 6, 2009.

U.S. Appl. No. 12/314,178, filed Dec. 5, 2008, in the name of Kentaro Yamauchi et al.

European Search Report issued in Patent Application No. EP 08171257.2, dated Mar. 6, 2009.

Office Action mailed Sep. 19, 2011 in U.S. Appl. No. 12/314,178.

* cited by examiner ical description of the configuration of the light source device;
LIGHT SOURCE DEVICE, PROJECTOR, AND DRIVING METHOD OF DISCHARGE LAMP

CROSS-REFERENCE TO RELATED APPLICATIONS

The present application claims the priority based on Japanese Patent Application No. 2007-325592 filed on Dec. 18, 2007, Japanese Patent Application No. 2008-204681 filed on Aug. 7, 2008, Japanese Patent Application No. 2007-322927 filed on Dec. 14, 2007, and Japanese Patent Application No. 2008-204658 filed on Aug. 8, 2008 the disclosures of which are hereby incorporated herein by reference in its entirety.

BACKGROUND OF THE INVENTION

1. Field of the Invention

The present invention relates to a light source device equipped with a discharge lamp that has a pair of electrodes, the driving method of such a discharge lamp, and a projector that incorporates such a discharge lamp.

2. Description of the Related Art

As a driving waveform for lighting a high intensity discharge lamp, a single drive waveform is used. However, when lighting with a single drive waveform continues for a long time, temperature distribution of the electrode is fixed for a long time. As a result, the asymmetry of the electrodes that occurs as a change of state over time tends to be fomented together with time. This causes formation of multiple bumps near the electrode tip, and causes the problem to occur flicker. To resolve the problem, JP2004-525496A discloses a lighting method of high intensity discharge lamps that supplies the alternating lamp current of which absolute value is roughly constant to the high intensity discharge lamp, and modulates pulse width of the alternating lamp current. In the disclosure, pulse width modulation at a lower frequency than the lighting frequency is performed by changing the pulse width ratio of the pulse width of the positive pulse to the pulse width of the negative pulse.

In certain light source, a sub-mirror for efficiently collecting light emitted toward the front is attached to the high intensity discharge lamp. In this case, even when modulating the pulse width of an alternating lamp current as disclosed in JP2004-525496A, degradation of the electrode at the sub-mirror side may excessively progress, and the left and right electrodes may degrade asymmetrically.

SUMMARY

An object of the present invention is to suppress relative temperature rise and early degradation of the electrode on the sub-mirror side, and to prevent biased consumption of the electrodes and biased precipitation of the electrode material in an apparatus such as a light source device and a projector equipped with the light source device.

According to an aspect of the present invention, a light source device is provided. The light source device has: a discharge lamp that emits light by discharge in an interelectrode space between a first electrode and a second electrode; a main mirror arranged at the first electrode side that reflects light flux generated by the discharge in the interelectrode space so as to emit the light flux to an area to be illuminated; a sub-mirror arranged at the second electrode side facing opposite the main mirror that reflects the light flux from the interelectrode space toward the interelectrode space; and a driver that supplies alternating current to the first and the second electrodes, and changes duty ratio of the alternating current supplied to the first and the second electrodes in accordance with a predetermined pattern, wherein maximum value of time ratio of a first anode period in which the first electrode works as anode to one cycle of the alternating current (hereafter, this ratio is also called the first anode duty ratio) is larger than maximum value of time ratio of a second anode period in which the second electrode works as anode to the one cycle of the alternating current (hereafter, this ratio is also called the second anode duty ratio).

With the aforementioned light source device, the driver changes duty ratio of the alternating current supplied to the first electrode and the second electrode in accordance with a predetermined pattern. By making the maximum value of the second anode duty ratio to be smaller than the maximum value of the first anode duty ratio, phenomenon that temperature of the second electrode of the sub-mirror side becomes higher than the first electrode of the main mirror side may be prevented. As a consequence, it is possible to suppress the phenomenon of early degradation only by the second electrode. By doing this, it is possible to maintain the illumination level of the illumination light from the light source device while also being able to lengthen the product life of the light source device.

The present invention may be reduced to practice in various modes, for example, an driving apparatus or method of a discharge lamp; a light source apparatus using a discharge lamp or a control method thereof; an image display apparatus such as a projector using such a method or apparatus; a computer program for carrying out the functions of such a method and apparatus; a recording medium having such a computer program recorded thereon; a data signal containing such a computer program and embodied in a carrier wave, and so on.

These and other objects, features, aspects, and advantages of the present invention will become more apparent from the following detailed description of the preferred embodiments with the accompanying drawings.

DESCRIPTION OF THE PREFERRED EMBODIMENT

First Embodiment

Figure 1:
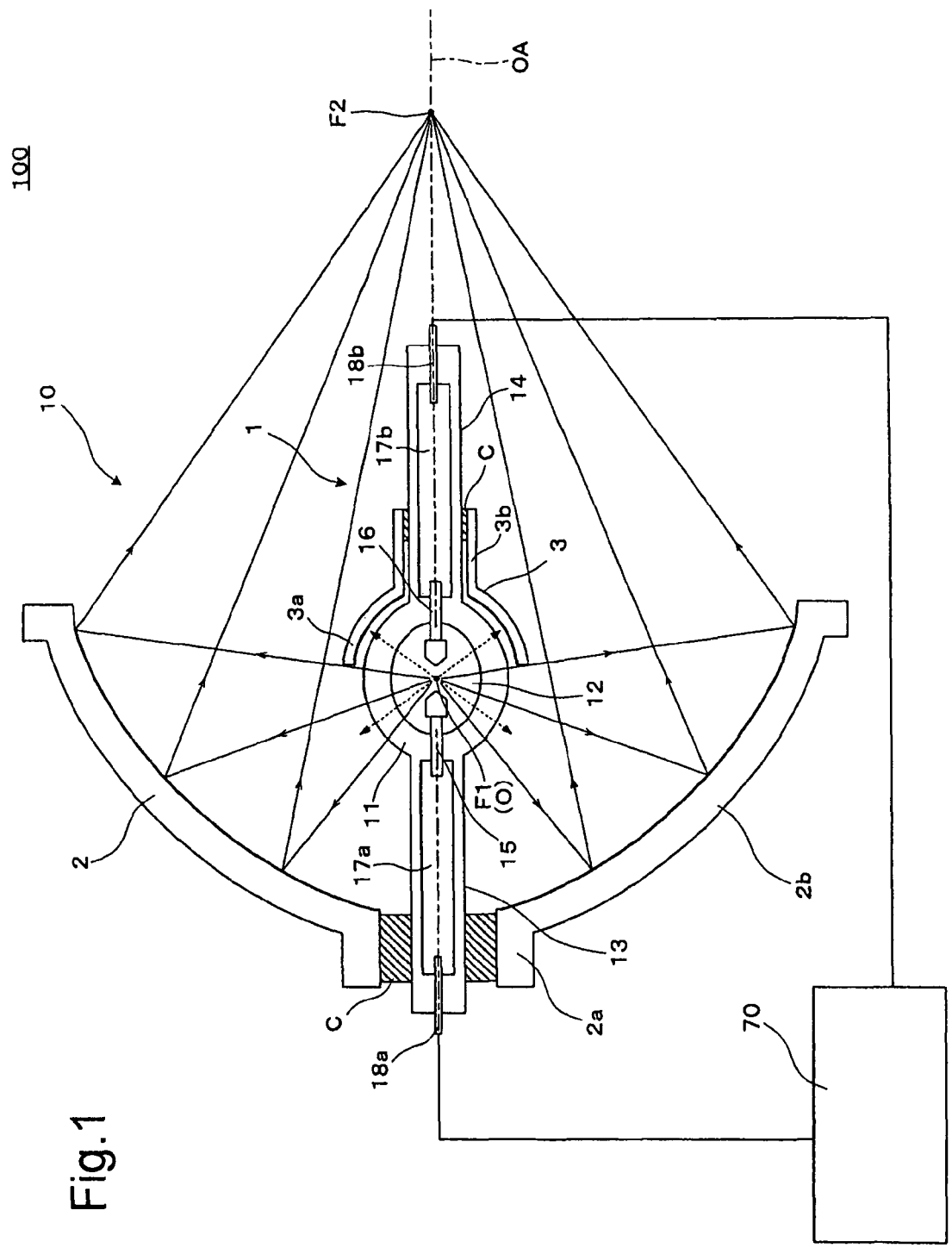
FIG. 1 is a cross sectional diagram showing a conceptual description of the configuration of the light source device.

Following, while referring to the drawings, apparatuses as a first embodiment of the present invention such as a light source device are described.

FIG. 1 is a cross section diagram showing a conceptual description of the configuration of the light source device 100. With the light source device 100, the light source unit 10 has a discharge light emission type discharge lamp 1 as a discharge lamp, a reflector 2 which is as an elliptic main reflective mirror, and a sub-mirror 3 which is a spherical reflective sub-mirror. As described in detail later, the light source driver 70 is configured as an electrical circuit for controlling light emission in the desired state by supplying alternating current to the light source unit 10.

In the light source unit 10, the discharge lamp 1 has a tube body 11 constituted by a translucent silica glass tube with the sealed center part bulged in a sphere shape. The light for illumination is emitted from the tube body 11. The discharge lamp 1 also has a first sealing portion 13 and a second sealing portion 14 that extend along the axial line passing through both ends of this tube body 11.

In a discharge space 12 formed inside the tube body 11, the tip of a first electrode 15 and the tip of second electrode 16 are arranged separated by a specified distance. Both of the electrodes 15 and 16 are made of tungsten. As discharge medium, gas containing a rare gas, a metal halogen compound and so on is enclosed in the discharge space 12. The sealing portions 13 and 14 that extend to both ends of this tube body 11 have molybdenum metal foils 17a and 17b which are electrically connected to the base of the first and second electrodes 15 and 16 provided at the tube body 11. Airtight seal of the discharge space to the outside is achieved by both of sealing portions 13 and 14. When the light source driver 70 supplies an alternating pulse current to lead lines 18a and 18b which are connected to the metal foils 17a and 17b, an arc discharge occurs between the pair of electrodes 15 and 16. This makes the tube body 11 to emit light at high brightness.

The sub-mirror 3 covers a part of the tube body 11 of the discharge lamp 1. Specifically, the sub-mirror 3 covers approximately half of the light flux emitting side (front side) where the second electrode 16 is located. The sub-mirror 3 is closely-arranged to the tube body 11. The sub-mirror 3 is an integrated molded product made of silica glass. The sub-mirror 3 has a reflective portion 3a, and a support 3b which supports the reflective portion 3a. The reflective portion 3a returns light flux emitted to the front side from the tube body 11 of the discharge lamp 1 to the tube body 11. The support 3b is fixed to the periphery of the second sealing portion 14. The second sealing portion 14 is inserted through the support 3b, and the support 3b holds the reflective portion 3a in a state aligned in relation to the tube body 11.

The reflector 2 covers another part of the tube body 11 of the discharge lamp 1. Specifically, the reflector 2 covers approximately half of the opposite side of light flux emitting side (back side) where the first electrode 15 is located. The reflector 2 is arranged facing opposite to the sub-mirror 3. This reflector 2 is an integrated molded product made of crystallized glass or silica glass. The reflector 2 has a neck 2a through which the first sealing unit 13 of the discharge lamp 1 is inserted, and an elliptical curved surface reflective portion 2b which widens from the neck 2a. The first sealing portion 13 is inserted through the neck 2a. The neck 2a hold the reflective portion 2b in a state aligned in relation to the tube body 11.

The discharge lamp 1 is arranged along the rotationally symmetric axis or the optical axis of the main reflective portion 2b which corresponds to the system optical axis OA. The light emitting center O between the first and second electrodes 15 and 16 within the tube body 11 is arranged so as to roughly match the first focal point F1 of the elliptical curved surface of the reflective portion 2b. When the discharge lamp 1 is lit, the light flux emitted from the arc at the periphery of the light emitting center O of the tube body 11 is reflected by the reflective portion 2b, or is reflected further by the reflective portion 2b after being reflected by the reflective portion 3a. The light flux converged at the second focal point F2 of the elliptical curved surface. In other words, the reflector 2 and the sub-mirror 3 have a roughly axially symmetrical reflective curved surface in relation to the system optical axis OA, and the pair of electrodes 15 and 16 are arranged so that axial cores of the electrode shafts roughly match the system optical axis OA.

The discharge lamp 1 is produced by supporting the first and second electrodes 15 and 16 which are fixed at the ends of the metal foils 17a and 17b in a silica glass tube, softening and shrinking the silica glass tube at the parts corresponding to both sealing portions 13 and 14 from the periphery by heating with a burner (shrink sealing). The discharge lamp 1 is fixed to the reflector 2 by inserting the first sealing portion 13 into the neck 2a of the reflector, filling an inorganic adhesive C by injection, and solidifying the adhesive C. The discharge lamp 1 is also fixed to the sub-mirror 3 by inserting the second sealing portion 14 of the discharge lamp 1 into the support 3b of the sub-mirror 3, filling an inorganic adhesive C by injection, and solidifying the adhesive C.

Figure 2:
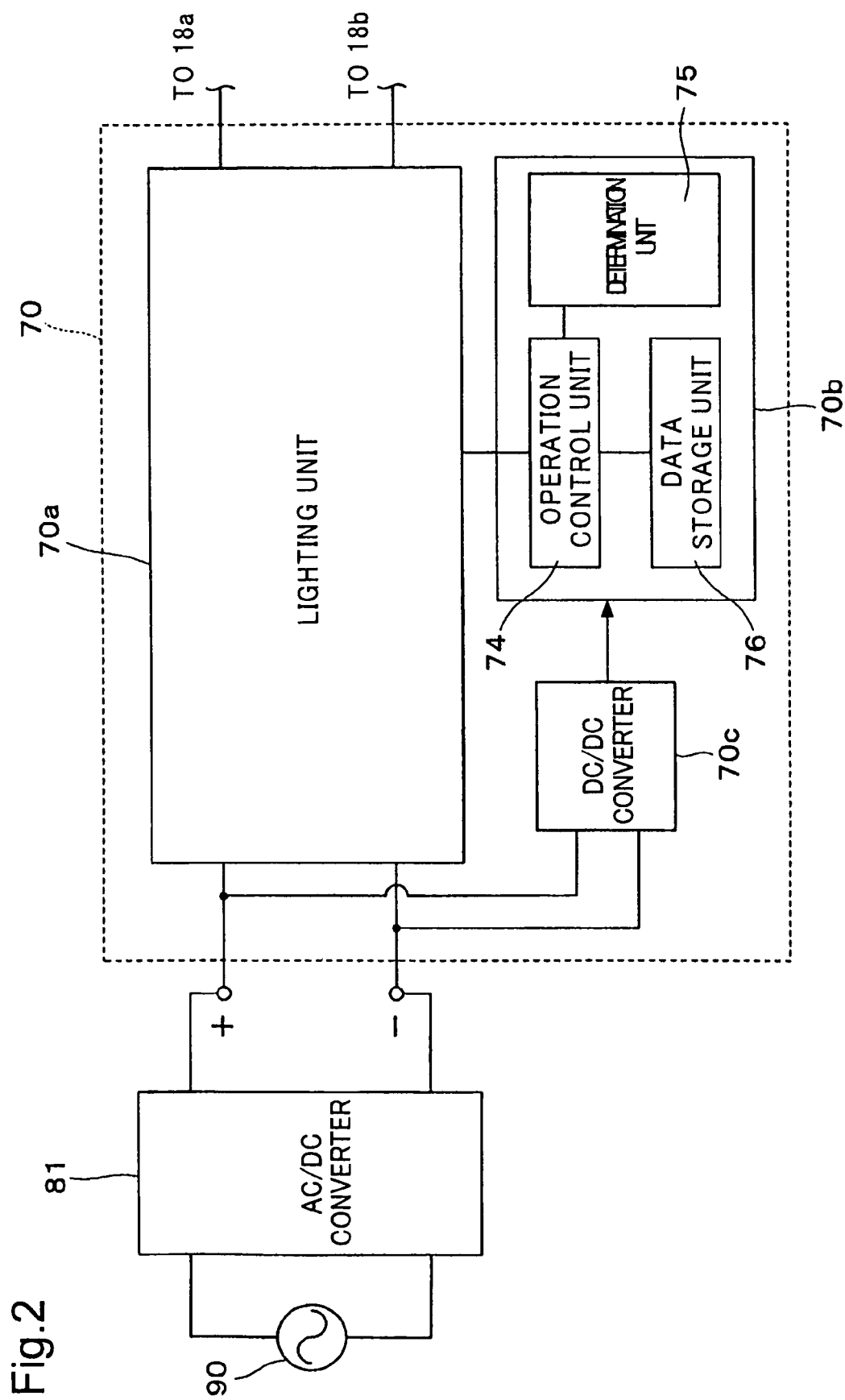
FIG. 2 is a block diagram schematically showing the configuration of the light source driver.

FIG. 2 is a block diagram schematically showing the configuration of the light source driver 70 for lighting the light source unit 10 shown in FIG. 1 in a desired state.

The light source driver 70 generates alternating current for causing discharge between the pair of electrodes 15 and 16 shown in FIG. 1, and controls the state of supplying alternating current to both electrodes 15 and 16. The light source driver 70 has a lighting unit 70a, a control unit 70b, and a DC/DC converter 70c. Here, as an example, a case is described of the light source driver 70 using an external power supply. In this case, the light source driver 70 is connected to an AC/DC converter 81, and the AC/DC converter 81 is connected to a commercial power supply 90. The AC/DC converter 81 converts the alternating current supplied from the commercial power supply 90 to direct current.

The lighting unit 70a is a circuit for driving and lighting the light source unit 10 of FIG. 1. With the lighting unit 70a, the drive waveform output from the light source driver 70 is adjusted. Here, the drive waveform is defined by the output current or voltage frequency, amplitude, duty ratio, positive/negative amplitude ratio, waveform characteristics and so on. To the light source unit 10, the lighting unit 70a may output drive current with various waveforms such as a square wave, a superimposed wave for which a triangular wave is superimposed on the square wave.

The control unit 70b is a circuit constituted from, for example, a microcomputer, memory, sensor, interface, and so on. The control unit 70b is driven by appropriate drive voltage generated by the DC/DC converter 70c as the power supply. The control unit 70b has a operation control unit 74 for controlling the operating state of the lighting unit 70a, a determination unit 75 for determining the state of the discharge lamp 1, and a data storage unit 76 for storing various information on the power feed state of the lighting unit 70a such as the power feed conditions.

The operation control unit 74 operates according to the program stored in the data storage unit 76 and so on. The operation control unit 74 selects an power feed condition suited for the current state of the discharge lamp 1 from the initial operating power feed conditions and the steady operating power feed conditions stored in the data storage unit 76. The operation control unit 74 performs the initial operation or the steady operation according to the selected power feed condition on the lighting unit 70a. Note that the operation control unit 74 works together with the lighting unit 70a, feeds power to the discharge lamp 1, and functions as a current drive device for performing the necessary lighting operation. With this embodiment, the steady operation means an operation to supply steady energy to the first electrode 15 and the second electrode 16. The initial operation means an operation during startup period before performing the steady operation to supply energy to the first electrode 15 and the second electrode 16 in an operation differs from the steady operation. To avoid formation of the steady convection flow AF, it is preferable that the length of the section period is less than or equal to 1 minute.

In order to estimate minimal length of the section period, we performed experiments to estimate transient characteristics of electrode temperature when the duty ratio was changed. In the experiments, the section period was set to 5 second, the duty ratio was changed from 20% to 80% in 10%, and the temperature of the electrode 15 was measured. When we increase the duty ratio from 40% to 50%, the temperature of the electrode 15 rose about 40 K. After the lapse of about 0.5 second from the change of the duty ratio from 40% to 50%, the temperature of the electrode 15 became stable. Before the stable period, a quasi-stable period in which the temperature rises gradually was observed. The rising amount of temperature $\Delta t$ during the transient period where the temperature changes rapidly may be estimated as the temperature difference between the temperature during the stable period before the change of the duty ratio and the temperature at the beginning of the quasi-stable period after the change of the duty ratio. It is possible to change the electrode temperature sufficiently, if the time in which the temperature changes in one-half of the temperature difference $\Delta t$ elapses. In the experiments, after the lapse of about 0.1 second from the change of the duty ratio, the temperature changed in one-half of the temperature difference $\Delta t$. With the experiments, it may be concluded that preferable length of the section period is longer than or equal to 0.1 second, and much preferable length of the section period is longer than or equal to 0.5 second.

The determination unit 75 determines degradation stage the discharge lamp 1 based on the state of the discharge lamp 1, specifically the cumulative lighting time of the discharge lamp 1, the voltage applied to the discharge lamp 1, and so on.

In addition to the program for operating the operation control unit 74, the data storage unit 76 stores a plurality of initial power feed conditions as a mode of the initial operation of the discharge lamp 1, and stores a plurality of steady power feed conditions as a mode of the steady operation of the discharge lamp 1. In specific terms, the data storage unit 76 stores various parameters including the setting values of the current value and frequency during startup or worming up performed as the initial operation. Also, the data storage unit 76 stores various parameters relating to the current value, frequency, duty ratio, modulation pattern of the duty ratio, triangular wave rising rate and the like during steady operation, or rated operation. The duty ratio modulation pattern includes parameters such as the variation range of the duty ratio, the length of section period, and the modulation frequency of the duty ratio. Here, the triangular wave rising rate represents the ratio of the maximum current value to the average current value during the half cycle of the superimposed wave for which a triangular wave is superimposed on a square wave.

Figure 3:
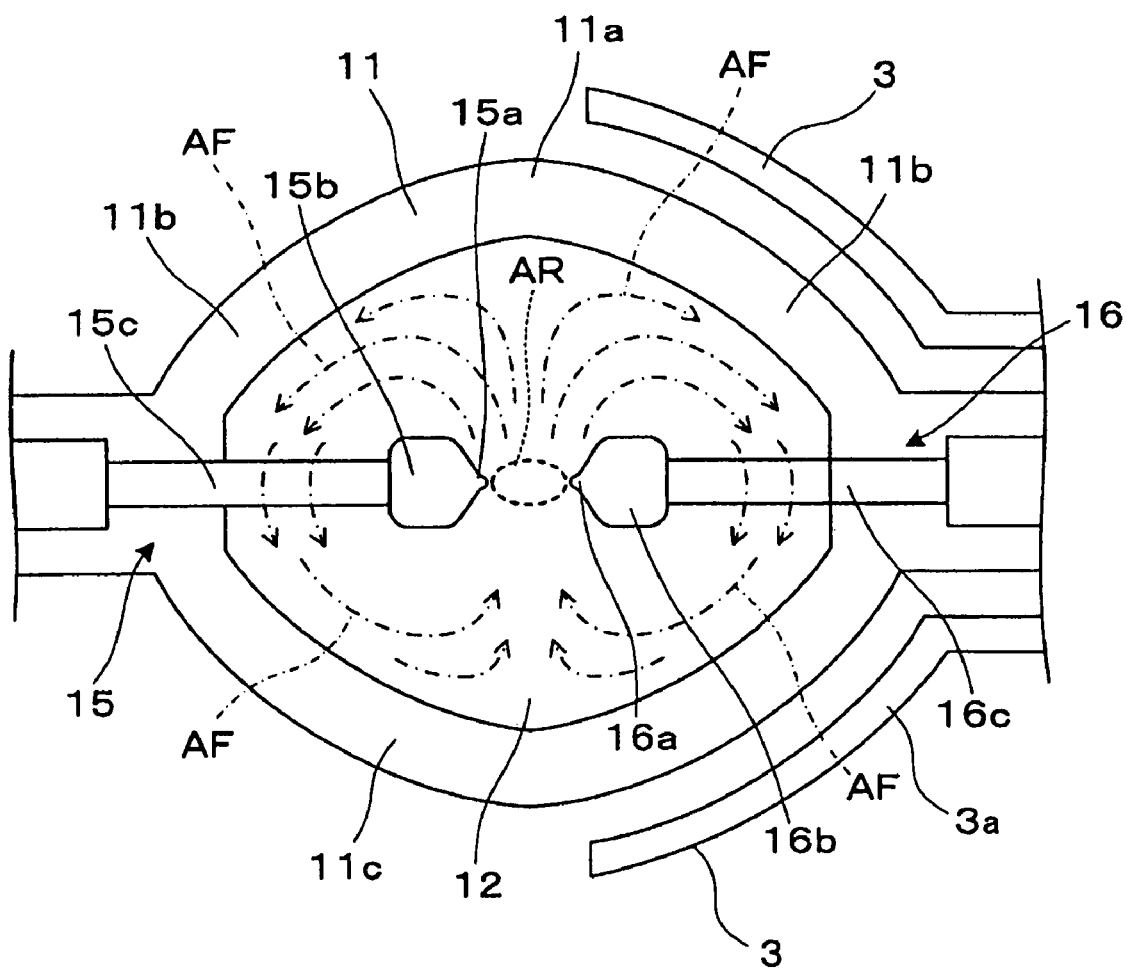
FIG. 3 is an enlarged cross sectional diagram for describing the convection flow in the discharge space.

FIG. 3 is an enlarged cross sectional diagram for describing the convection flow in the discharge space 12 formed in the tube body 11 of the discharge lamp 1 of FIG. 1. At the inside of the tube body 11, both of the first and second electrodes 15 and 16 have tip 15a and 16a, large-diameter portions 15b and 16b, and shafts 15c and 16c. During the steady operation in which the rated operation of the discharge lamp 1 is performed, an arc AR is formed by the arc discharge between the tips 15a and 16a of the pair of electrodes 15 and 16. This arc AR and its nearby area become very high in temperature. As a result, inside of the discharge space 12, a convection flow AF that flows upward from the arc AR is formed. This convection flow AF moves along the upper half part 11b when it reaches the top part 11a of the tube body 11, and is cooled while flowing down around the shafts 15c and 16c and electrodes 15 and 16. The convection flow AF which flows down in this way further flows down along the bottom half part 11c of the tube body 11. By mutually colliding the convection flow AF beneath the arc AR, the convection flow AF rises and returns to the arc AR at upside. In other words, the convection flow AF is formed and circulates in the periphery of both electrodes 15 and 16. Since such a convection flow AF contains electrode material which is melted and evaporated by the arc AR, the steady convection flow causes deposition or precipitation of the electrode material on the shafts 15c and 16c, and growth of whisker in a needle shape. In consequence, unintentional discharge toward the upper half part 11b may occur. Such unintentional discharge causes degradation of the inner wall of the tube body 11 and decrease of the product life of the discharge lamp 1. Also, when lighting with a single drive waveform continues for a long time, a temperature distribution of the electrode is fixed for a long time. As a result, the asymmetry of the electrodes that occurs as a change of state over time tends to be fomented together with time. So as to resolve such a problem, the duty ratio of the alternating current supplied between the first and second electrodes 15 and 16 is changed, and by cyclically fluctuating the temperature distribution of the electrodes 15 and 16, biased degradation of the electrodes is prevented, and furthermore, with a temperature difference of several hundred K that occurs with the left and right electrodes 15 and 16, formation of a steady convection flow AF inside the discharge space 12 is prevented. In specific terms, with a cycle sufficiently long compared to the cycle of the current waveform of the fixed frequency (lighting frequency) supplied to the pair of electrodes 15 and 16, the duty ratio of the current waveform (alternating current duty ratio) is cyclically changed. At this time, in order to enlarge fluctuation of the convection flow AF, as the pattern for cyclically changing the duty ratio of the current waveform supplied to both electrodes 15 and 16, is used a pattern having a plurality of section periods which constitute duty ratio change cycle or duty ratio modulation cycle where the duty ratio is maintained for at least a fixed duration in each section period. In other words, the duty ratio of the current waveform supplied to the electrodes 15 and 16 is changed gradually, and is increased and decreased cyclically.

To describe specific operation conditions, it is assumed that the lighting frequency supplied to both electrodes 15 and 16 is relatively high, for example approximately 60 Hz to 500 Hz. Then, each section period constituting the duty ratio modulation cycle is, for example, approximately 1 second or greater (10 seconds with the specific example), and the duty ratio in each section period is maintained at a fixed value. Here, by segmenting the duty ratio into approximately 10, for example (16 with the specific example), total length of each section period, or the modulation cycle of the duty ratio becomes 10 seconds or greater (160 seconds with the specific example), for example. By modulating the duty ratio with this kind of modulation pattern, it is possible to gradually fluctuate the heat state of both electrodes 15 and 16 and their vicinity with a long span so as to affects the convection flow AF. Thus, formation of a steady convection flow AF inside the tube body 11 of the discharge lamp 1 may be avoided. As a result, it is possible to prevent growth of electrode material whisker at unintended locations of both electrodes 15 and 16, and furthermore, to prevent biased degradation of both electrodes 15 and 16.

Following, the reason why the second electrode 16 of the sub-mirror 3 side goes to a high temperature more easily than the first electrode 15 of the reflector 2 side is described. First, the second electrode 16 is arranged closer to the sub-mirror 3 than the first electrode 15, so the second electrode 16 is more easily exposed to the radiation heat from the sub-mirror 3. In consequence, it is easier for the second electrode 16 to become relatively high in temperature compared to the first electrode 15. Also, the light source unit 10 is cooled to a suitable temperature by the cooling wind from the cooling device (not illustrated). However, of the tube body 1 of the discharge lamp 1, there is a tendency for the cooling efficiency to decrease with the hemisphere side covered by the sub-mirror 3. In consequence, it is relatively easier for the second electrode 16 to have a higher temperature than the first electrode 15. As described above, the second electrode 16 on the sub-mirror 3 side goes to a high temperature more easily than the first electrode 15, so degradation of the second electrode 16 is accelerated. To resolve such a problem, when cyclically changing the duty ratio of the alternating current supplied between the first and second electrodes 15 and 16 as described above, by setting the maximum value DM2 of the duty ratio when the second electrode 16 works as a anode (second anode duty ratio) smaller than the maximum value DM1 of the duty ratio when the first electrode 15 works as a anode (first anode duty ratio). This allows suppression of the temperature rising of the second electrode 16 of the sub-mirror 3 side. In specific terms, the maximum value DM1 of the first anode duty ratio relating to the first electrode 15 is 70%, for example, and the maximum value DM2 of the second anode duty ratio relating to the second electrode 16 is 65%, for example. By changing the duty ratio as described above, it is possible to prevent biased consumption of the second electrode 16 of the sub-mirror 3 side while maintaining the brightness of the arc AR.

Figure 4:
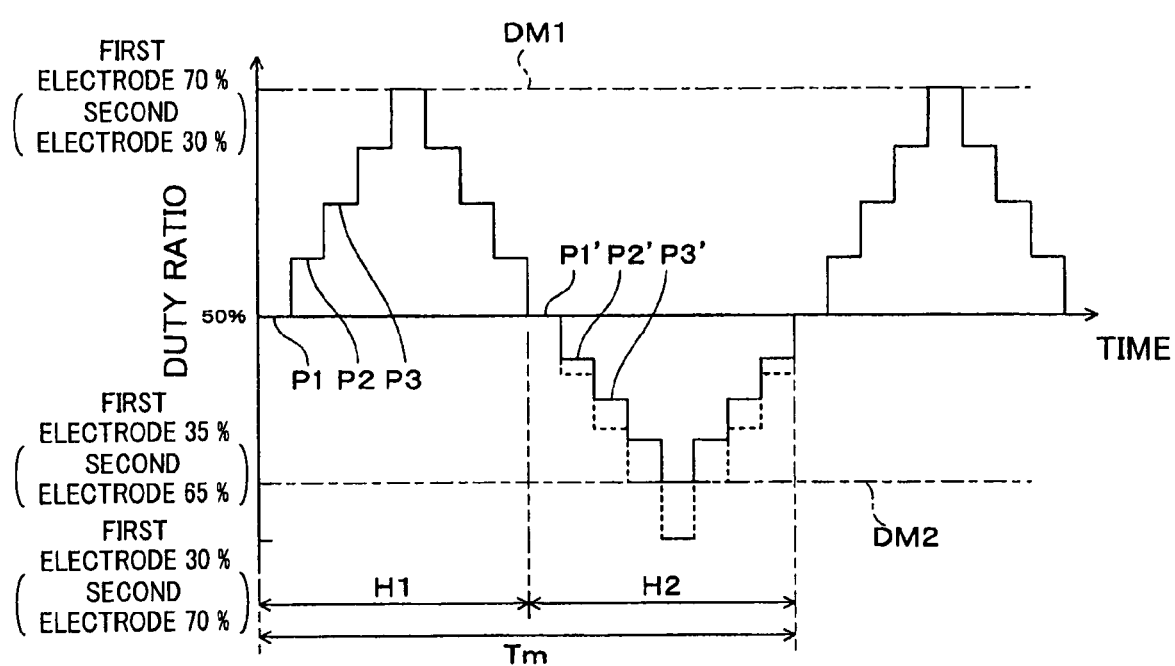
FIG. 4 is a graph describing the pattern for modulating the duty ratio of the alternating current.

FIG. 4 is a graph describing the modulation of the duty ratio of the alternating current supplied to the pair of electrodes 15 and 16. The horizontal axis represents time, and the vertical axis represents the duty ratio. As shown by the solid line, the duty ratio of the alternating current supplied to both electrodes 15 and 16 increases and decreases cyclically with the cycle Tm by changing the duty ratio at a fixed amount for each section period. Each cycle Tm consists of the anterior half period H1 for which the anode period of the first electrode 15 is relatively long and the posterior half period H2 for which the anode period of the second electrode 16 is relatively long. Also, the duty ratio changes in a total of 9 stages with 4 stages during anterior half cycle H1 where the anode period of the first electrode 15 of the reflector 2 side is longer than the anode period of the second electrode 16, 4 stages during the posterior half cycle H2 where the anode period of the second electrode 16 of the sub-mirror 3 side is longer than the anode period of the first electrode 15, and one stage where the duty ratio of both electrodes 15 and 16 are equally 50%. In this case, the maximum value DM1 of the first anode duty ratio in the anterior half cycle H1 where the first electrode 15 is biased to the anode is 70%. Meanwhile, the maximum value DM2 of the second anode duty ratio in the posterior half cycle H2 where the second electrode 16 is biased to the anode is 65%. In other words, the maximum value DM2 of the second anode duty ratio where the second electrode 16 works as an anode is smaller than the maximum value DM1 of the first anode duty ratio where the first electrode 15 works as an anode. For reference, the modulation pattern for which the second anode duty ratio where the second electrode 16 works as an anode is 70% is shown in FIG. 4 by a dashed line. In the case of the modulation pattern shown by this dashed line, the maximum values of the duty ratios of each of the electrodes 15 and 16 works as an anode are equal to each other.

Figure 5:
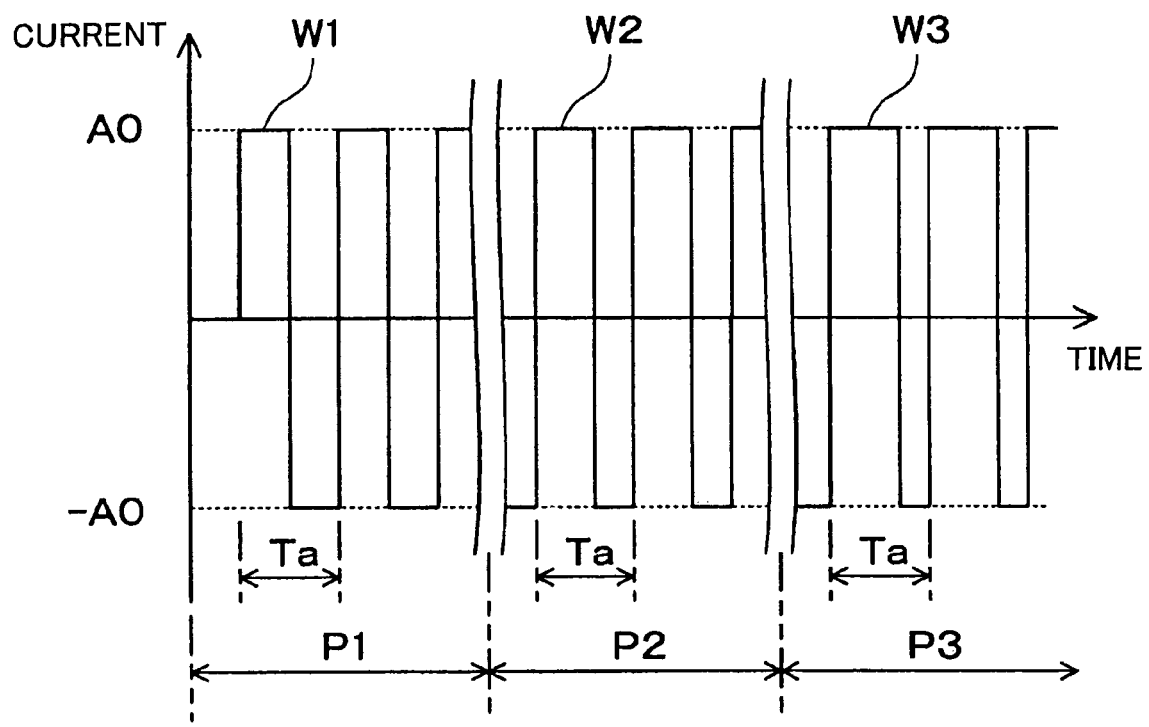
FIG. 5 is a graph for describing the waveform of the alternating current actually supplied.

FIG. 5 is a graph for describing the waveform of the alternating current actually supplied to the pair of electrodes 15 and 16. The horizontal axis represents time, and the vertical axis represents the current value. Current of a square wave with the fixed current value A0 is supplied to both electrodes 15 and 16 at a fixed lighting frequency corresponding to the cycle Ta. However, in each waveform W1, W2, and W3 during respective section period P1, P2, and P3 within the anterior half cycle H1 of the cycle Tm in FIG. 4, the duty ratio of the alternating current is maintained to a fixed value, and at the time of switching the section period P1, P2, P3 the duty ratio of each waveform W1, W2, and W3 changes gradually. In specific terms, in the case that the first and second anode duty ratio of the waveform W1 of both electrodes 15 and 16 are respectively 50% at the section period P1, the first and second anode duty ratio of the waveform W2 of both electrodes 15 and 16 respectively become 55% and 45% at the next section period P2, for example, and the first and second anode duty ratio of the waveform W3 of both electrodes 15 and 16 are respectively 60% and 40% at the next section period P3, for example. The description above relating to the anterior half cycle H1 of the cycle Tm of FIG. 4 is similar to the current waveform within the posterior half cycle H2 as well except for the value of duty ratio. Specifically, in the case that the first and second anode duty ratio of the waveform W1 of both electrodes 15 and 16 are respectively 50% at the section period P1', the first and second anode duty ratio of the waveform W2 of both electrodes 15 and 16 are respectively 46.2% and 53.8% at the next section period P2', and the first and second anode duty ratio of the waveform W3 of both electrodes 15 and 16 are respectively 42.5% and 57.5% at the next section period P3', for example. As a result, as shown in FIG. 4, at a fixed modulation frequency corresponding to the cycle Tm, the first anode duty ratio of the first electrode 15 side changes cyclically in the relatively high modulation range from the minimum value of 35% to the maximum value DM1 of 70%, and the second anode duty ratio of the second electrode 16 side changes cyclically in a relatively low modulation range from the minimum value of 30% to the maximum value DM2 of 65%.

Note that with the duty ratio modulation such as that shown in FIG. 4 and FIG. 5, it is not necessary to maintain at a fixed level the lighting frequency and current value of the current supplied to both electrodes 15 and 16, and it is possible to set different lighting frequencies and current values for each of the section periods P1, P2, P3, and so on.

Also, with the duty ratio modulation as shown in FIG. 4 and FIG. 5, the setting values such as the lighting frequency, the current value, the variable range of the duty ratio, the length of section period, the modulation cycle, and so on may be changed by increasing or decreasing based on information relating to the level of consumption of both electrodes 15 and 16 and other degradation levels obtained with the determination unit 75. For example, when the degradation of both electrodes 15 and 16 has progressed, by temporarily increasing or decreasing the lighting frequency and the current value, it is possible to maintain the shape of tips 15a and 16a of both electrodes 15 and 16. Further, by increasing the variable range of duty ratio, it is possible to credibly melt electrodes for which melting becomes difficult by degradation over time, and to maintain shape of the electrodes to desirable shape.

Figure 6A:
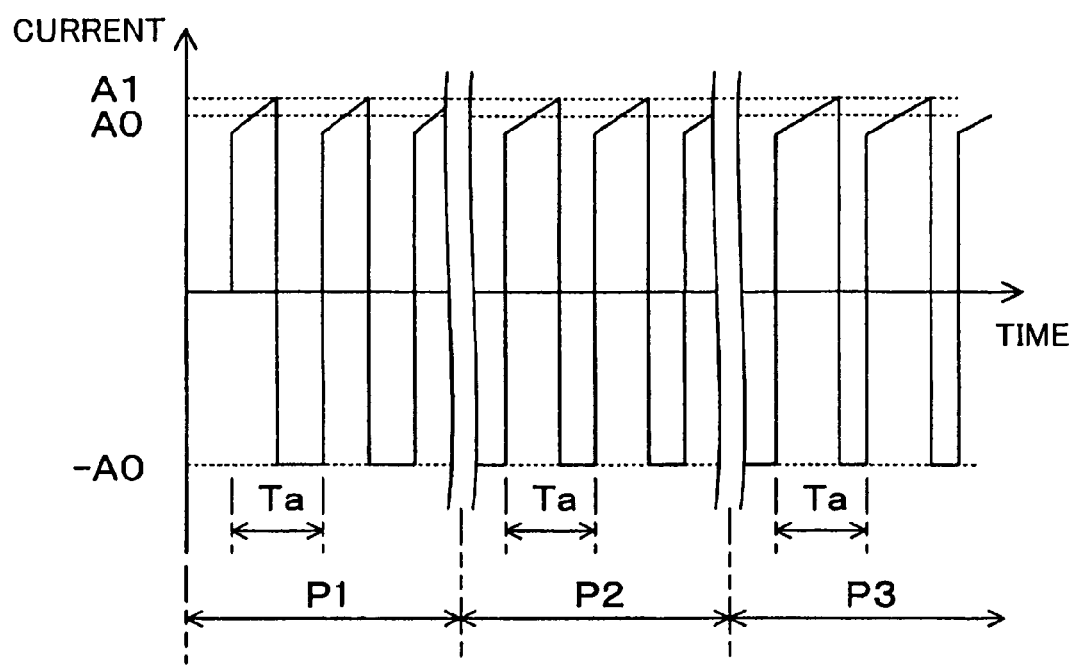
FIGS. 6A and 6B are graphs for describing an exemplary variation of the modulation of the duty ratio.

FIG. 6A is a graph for describing an exemplary variation of the modulation of the duty ratio shown in FIG. 5. This case is similar to above in that during each section period P1, P2, P3 within the anterior half cycle H1, the duty ratio of the alternating current is maintained at a fixed level, and that at the time of switching of the section periods P1, P2, P3 the duty ratio changes in stages. Meanwhile, when the time ratio of the period where the polarity is positive or negative to the cycle of the alternating current is at least 50%, i.e. when the first electrode 15 works an anode in the case of FIG. 6A, current of a superimposed wave for which a gradually increasing triangular wave is superimposed on a square wave is supplied. The average current value of the superimposed wave is maintained at A0, but the peak value is A1. Here, the triangular wave rising rate A1/A0, which is defined as the ratio of the peak value A1 in relation to the average current value A0, of the superimposed wave is higher than triangular wave rising rate of the square wave which is equal to 1. By adjusting the triangular wave rising rate, it is possible to increase the melting volume of the first electrode 15, and to suppress flicker when the second electrode 16 works as a cathode.

Figure 6B:
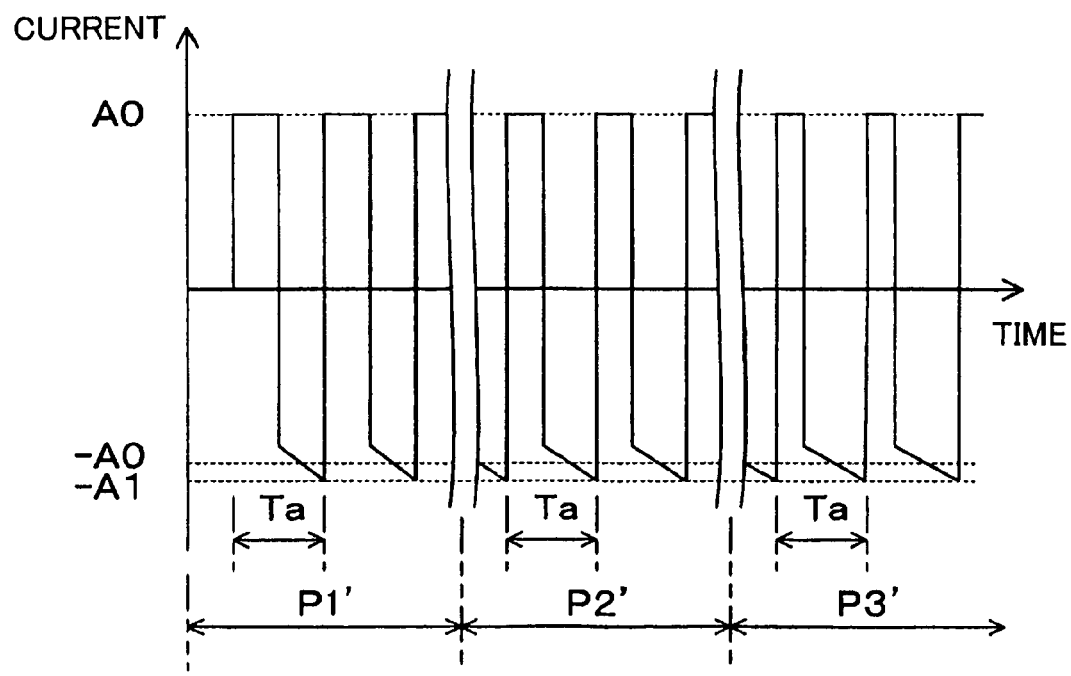

FIG. 6B corresponds to FIG. 6A, but shows each section period P1', P2', P3' within the posterior half cycle H2. In this case as well, the duty ratio of the alternating current is maintained at a fixed level during each section period P1', P2', P3', and that at the switching time of the section period P1', P2', P3' the duty ratio changes in stages, similar to the case of FIG. 5. Meanwhile, when the time ratio of the period where the polarity is positive or negative to the cycle of the alternating current is at least 50%, i.e. when the second electrode 16 works an anode in the case of FIG. 6B, current of a superimposed wave for which a gradually increasing triangular wave is superimposed on a square wave is supplied. The average current value of the superimposed wave is maintained at A0, but the peak value is A1. Here, the triangular wave rising rate A1/A0 of the superimposed wave is higher than triangular wave rising rate of the square wave which is equal to 1. By adjusting the triangular wave rising rate, it is possible to suppress flicker when the first electrode 15 works as a cathode and to increase the melting volume of the second electrode 16.

Note that it is possible to combine the operations of FIG. 6A and FIG. 6B, but it is also possible to have this be only the operation of FIG. 6 A. Specifically, it is possible to use the square wave for the anterior half cycle H1 where the first electrode 15 anode period is relatively long, and to use the superimposed wave shown in FIG. 6B only for the posterior half cycle H2 where the second electrode 16 anode period is relatively long.

In the above exemplary variation, as the waveform for which the ratio of the time during polarity being positive or negative to the cycle of the alternating current is greater than or equal to 50%, a superimposed wave, which a gradually increasing triangular wave is superimposed on the basic square wave, is used to vary the current. It is also possible to vary the current based on the information relating to the degradation stages of both electrodes 15 and 16 and the like. In addition, it is also possible to vary the current by changing waveforms so that the current value is maximum at the end of the polarity period where the time ratio of the polarity to one cycle of the alternating current is greater than or equal to 50%, and by superimposing various types of waveforms such as triangular waves that increase in the posterior half of the half cycle, square waves, and sine waves on the basic square wave.

Also, for modulation of the duty ratio like that shown in FIGS. 6A and 6B, it is possible to change the setting values such as the duty ratio variation range, section period length, lighting frequency, current value and the like based on the consumption level and other information relating to the degradation stage of both electrodes 15 and 16 obtained by the determination unit 75.

Figure 7:
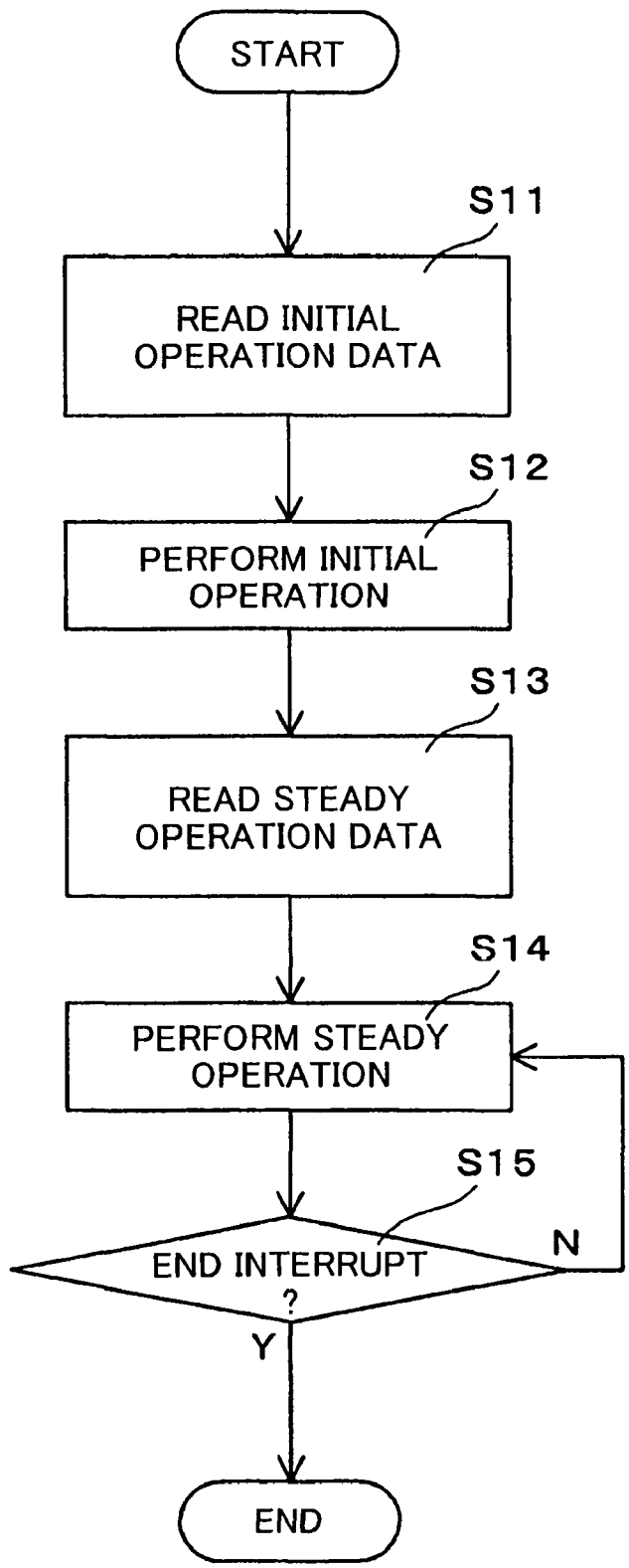
FIG. 7 is a flow chart for describing the operation of the light source driver.

FIG. 7 is a flow chart for describing the operation of the light source driver 70. The control unit 70b reads suitable initial operation data necessary for lighting start of the discharge lamp 1 (step S11) from the operation control table stored in the data storage unit 76.

Next, the control unit 70b controls the lighting unit 70a based on the initial power feed conditions read at step S11, and controls the initial operation including the run up operation from the startup of the discharge lamp 1 (step S12).

Next, the control unit 70b reads suitable steady operation data necessary for maintaining light emission of the discharge lamp 1 from the operation control table stored in the data storage unit 76 (step S13). In specific terms, it reads setting values of the steady operation time such as the current value, the lighting frequency, the duty ratio variable range, the section period length, the modulation frequency, the triangular wave rising rate and the like. At this time, a modulation pattern including the lighting waveform such as the current value and the lighting frequency, the duty ratio variation range, the section period length, the modulation frequency or the like is selected based on the consumption level and other information relating to the degradation stage of both electrodes 15 and 16 obtained by the determination unit 75.

Next, the control unit 70b controls the steady operation of the discharge lamp 1 of the lighting unit 70a (step S14) based on the steady power feed conditions read at step S13. The specific operation is shown by example in FIG. 4 and FIG. 5.

Here, during steady operation, the determination unit 75 determines whether or not the interrupt request signal requesting the end of the lighting operation of the light source unit 10 has been input (step S15). When this kind of interrupt request signal has been input, information indicating the recent state of the discharge lamp 1 such as the recent cumulative lighting time, the recent voltage supplied to the discharge lamp 1 and the like is recorded in the data storage unit 76, and the process moves to the light turn-off operation.

As is clear from the description above, with the light source device 100 of this embodiment, with the steady operation for which the discharge lamp 1 has rated operation done by the lighting unit 70a which operates under the control of the control unit 70*b*, the duty ratio of the alternating current supplied between the first and second electrodes 15 and 16 is changed by a specified modulation pattern that increases and decreases in stages with a fixed cycle. Furthermore, the maximum value D2 of the second anode duty ratio when the second electrode 16 works as an anode is smaller than the maximum value D1 of the first anode duty ratio when the first electrode 15 works as an anode. So even in a case when the second electrode 16 receives a strong heat effect from the sub-mirror 3, it is possible to cancel this kind of effect and suppress the rise in temperature of the second electrode 16. Thus, it is possible to relatively decrease the damage received by the second electrode 16, and possible to suppress early degradation only at the second electrode 16. By doing this, it is possible to maintain the illumination level of the illumination light from the discharge lamp 1, and it is possible to lengthen the product life of the discharge lamp 1 or the light source device 100.

Figure 8:
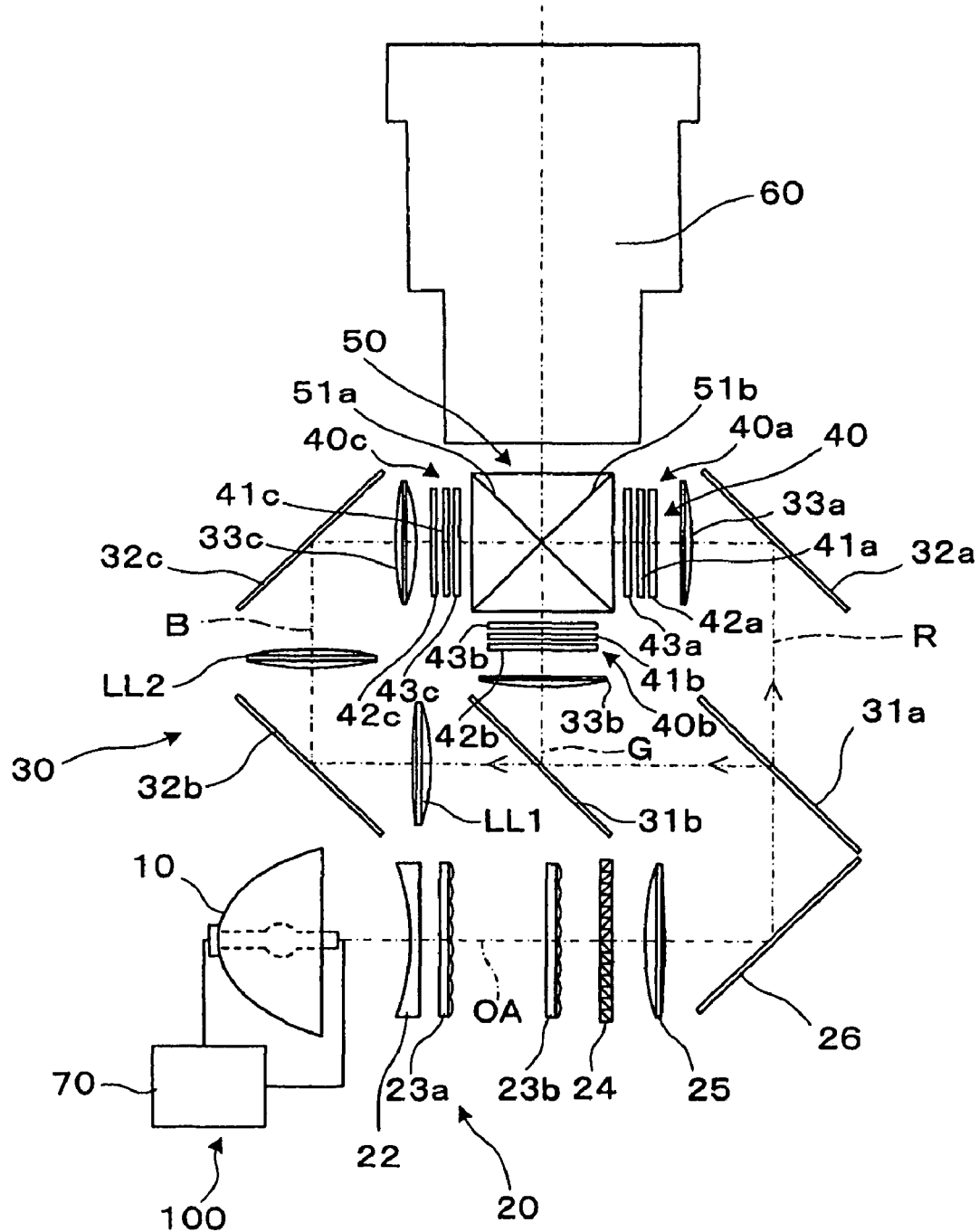
FIG. 8 is a schematic drawing for describing the configuration of a projector incorporating the light source device.

FIG. 8 is a schematic drawing for describing the configuration of a projector incorporating the light source device 100 of FIG. 1. The projector 200 has the light source device 100, the illumination optical system 20, a color separation optical system 30, a light modulating unit 40, a cross dichroic prism 50, and a projection lens 60. Here, the light modulating unit 40 includes three liquid crystal light valves 40*a*, 40*b*, and 40*c* having the same configuration.

With the aforementioned projector 200, the light source device 100 is equipped with the light source unit 10 and the light source driver 70 shown in FIG. 1. The light source device generates illumination light for illuminating the light modulating unit 40, i.e. the liquid crystal light valves 40*a*, 40*b*, and 40*c* via the illumination optical system 20 etc.

The illumination optical system 20 has a parallelizing lens 22 which parallelizes the light from the source light into the light flux direction, a first and second fly eye lens 23*a* and 23*b* constituting the integrator optical system for dividing and superimposing light, a polarization conversion component 24 which aligns the polarization direction of the light, a superimposing lens 25 which superimposes the light via both fly eye lenses 23*a* and 23*b*, and a mirror 26 which bends light path. With the illumination optical system 20, the parallelization lens 22 converts the light flux direction of the illumination light emitted from the light source unit 10 to be roughly parallel. The first and second fly eye lenses 23*a* and 23*b* respectively consist of a plurality of element lenses arranged in matrix form, and the light via the parallelization lens 22 is divided and converged individually by the element lens constituting the first fly eye lens 23*a*, and the divided light flux from the first fly eye lens 23*a* is emitted at a suitable divergence angle by the element lens constituting the second fly eye lens 23*b*. The polarization conversion component 24 is formed by an array which has a PBS, a mirror, and a phase difference plate and the like as a set of elements. The polarization conversion component 24 aligns the polarization direction of the light flux of each part divided by the first fly eye lens 23*a* to linear polarized light of one direction. The superimposing lens 25 suitably converges entirety of the illumination light via the polarization conversion component 24. This allows the illuminated area of the liquid crystal light valves 40*a*, 40*b*, and 40*c* which are the light modulation devices of each color of the latter stage to be illuminated by superimposed light. In other words, the illumination light via both fly eye lenses 23*a* and 23*b* and the superimposing lens 25 is uniformly superimposed and illuminated through the color separation optical system 30 described later on each of the liquid crystal panel 41*a*, 41*b*, and 41*c* of the light modulation unit 40 provided for each color.

The color separation optical system 30 has first and second dichroic mirrors 31*a* and 31*b*, reflective mirrors 32*a*, 32*b*, and 32*c*, and three field lenses 33*a*, 33*b*, and 33*c*. The illumination light emitted from the illumination light optical system 20 is divided into the three color lights of red (R), green (G), and blue (B). Each of the color light is led to the latter stage liquid crystal light valves 40*a*, 40*b*, and 40*c*. To describe this in more detail, first, of the three colors RGB, the first dichroic mirror 31*a* transmits the R light and reflects the G light and B light. Also, of the two colors GB, the second dichroic mirror 31*b* reflects G light and transmits B light. Next, with this color separation optical system 30, the R light transmitted through the first dichroic mirror 31*a* incidents into the field lens 33*a* for adjusting the incident angle via the reflective mirror 32*a*. Also, the G light reflected by the first dichroic mirror 31*a* and the second dichroic mirror 31*b* incident into the field lens 33*b* for adjusting the incident angle. Furthermore, the B light transmitted through the second dichroic mirror 31*b* incidents into the field lens 33*c* for adjusting the incident angle via relay lenses LL1 and LL2 and the reflective mirrors 32*b* and 32*c*.

The liquid crystal light valves 40*a*, 40*b*, and 40*c* that constitute the light modulating unit 40 are non-light emitting type light modulation device for modulating spatial intensity distribution of the incident illumination light. The liquid crystal light valves 40*a*, 40*b*, and 40*c* are equipped with three liquid crystal panels 41*a*, 41*b*, and 41*c* respectively illuminated corresponding to each color light emitted from the color separation optical system 30, three first polarization filters 42*a*, 42*b*, and 42*c* respectively arranged at the incidence side of each liquid crystal panel 41*a*, 41*b*, and 41*c*, and three second polarization filters 43*a*, 43*b*, and 43*c* arranged respectively at the emitting side of each liquid crystal panel 41*a*, 41*b*, and 41*c*. The R light transmitted through the first dichroic mirror 31*a* incidents into the liquid crystal light valve 40*a* via the field lens 33*a* etc., and illuminates the liquid crystal panel 41*a* of the liquid crystal light valve 40*a*. The G light reflected by both the first and second dichroic mirrors 31*a* and 31*b* incidents into the liquid crystal light valve 40*b* via the field lens 33*b* etc., and illuminates the liquid crystal panel 41*b* of the liquid crystal light valve 40*b*. The B light reflected by the first dichroic mirror 31*a* and transmitted through the second dichroic mirror 31*b* incidents into the liquid crystal light valve 40*c* via the field lens 33*c* etc., and illuminates the liquid crystal panel 41*c* of the liquid crystal light valve 40*c*. Each liquid crystal panel 41*a* to 41*c* modulates the spatial distribution of the polarization direction of the illumination light, and the polarized light status of the three color lights incident respectively on each liquid crystal panel 41*a* to 41*c* is adjusted pixel-by-pixel according to a drive signal or image signal input as an electrical signal to each of the liquid crystal panels 41*a* to 41*c*. At this time, the polarization direction of the illumination light which incident into each liquid crystal panel 41*a* to 41*c* is adjusted by the first polarization filters 42*a* to 42*c*, and modulated light of a specified polarization direction is extracted from the modulated light emitted from each liquid crystal panel 41*a* to 41*c* by the second polarization filters 43*a* to 43*c*. By the above, each liquid crystal light valve 40*a*, 40*b*, and 40*c* forms each color image light corresponding respectively.

The cross dichroic prism 50 synthesizes each color image light from each liquid crystal light valve 40*a*, 40*b*, and 40*c*. To explain this in more detail, the cross dichroic prism 50 is made in a plan view roughly square shape with four right angle prisms adhered together, and at the interface where the right angle prisms are adhered together, a pair of dielectric multi layer films 51*a* and 51*b* that intersect in an X shape are formed. One first dielectric multi layer film 51*a* reflects the R light, and the other second dielectric multi layer film 51*b* reflects the B light. With the cross dichroic prism 50, the R light from the liquid crystal light valve 40*a* is reflected by the dielectric multi layer film 51*a* and emitted to the progression direction right side, the G light from the liquid crystal light valve 40*b* is advanced straight ahead and emitted via the dielectric multi layer films 51*a* and 51*b*, and the B light from the liquid crystal light valve 40*c* is reflected by the dielectric multi layer film 51*b* and emitted to the progression direction left side. Working in this way, the R light, G light, and B light are synthesized by the cross dichroic prism 50, and a synthesized light which is an image light is formed with a color image.

The projection lens 60 is a projection optical system that enlarges the synthesized light formed via the cross dichroic prism 50 as the image light at a desired enlargement ratio and projects a color image on a screen (not illustrated).

With the projector 200 described above, it is possible to prevent biased and quickened degradation of only one of the pair of electrodes 15 and 16 constituting the light source device 100, and to maintain the projection brightness of the projector 200 over a long time.

Second Embodiment

Following, the light source device of the second embodiment will be described. Note that the light source device of the second embodiment is a variation of the light source device 100 of the first embodiment, and parts that are not specifically described are the same as those of the light source device 100 of the first embodiment.

Figure 9:
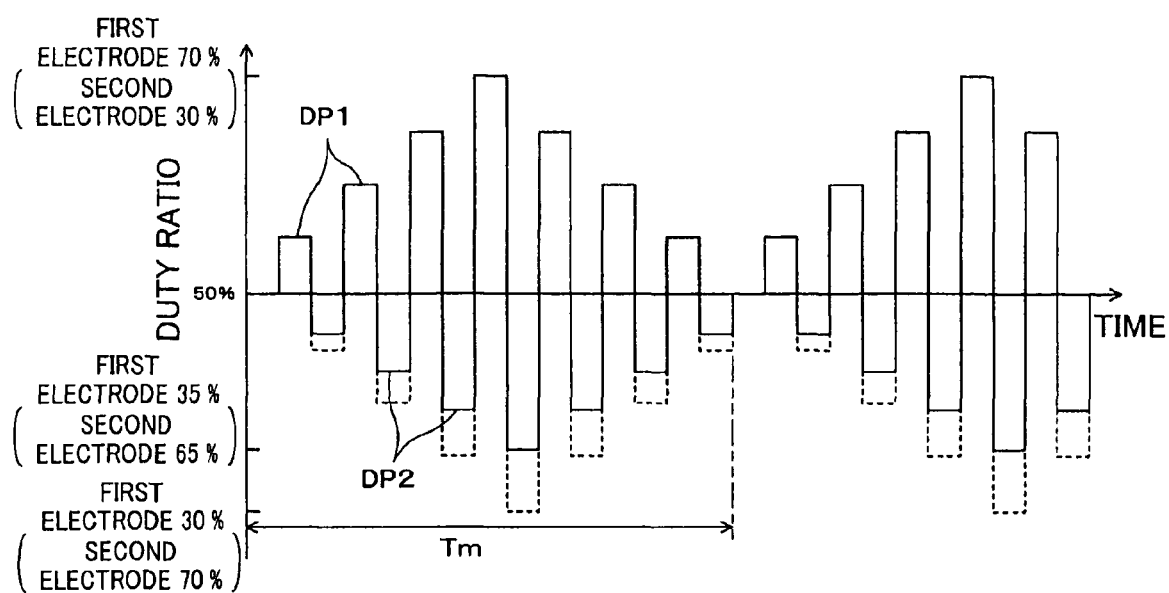
FIG. 9 is a graph for describing the modulation of the duty ratio of the alternating current in the second embodiment.

FIG. 9 is a graph for describing the modulation of the duty ratio of the alternating current supplied to the pair of electrodes 15 and 16. The horizontal axis represents time, and the vertical axis represents duty ratio. With this modulation pattern of the alternating current supplied to both electrodes 15 and 16 as shown by the solid line, the section period DP1 for which the first anode duty ratio is greater than or equal to 50% where the first electrode 15 anode period is relatively long, and the section period DP2 for which the first anode duty ratio is less than or equal to 50% where the second electrode 16 anode period is relatively long are alternately repeated. As is also clear from the graph, the first anode duty ratio of the first electrode side changes in a relatively high modulation range from the minimum value of 35% to the maximum value DM1 of 70%, and the second anode duty ratio of the second electrode 16 side changes in a relatively low modulation range from the minimum value of 30% to the maximum value DM2 of 65%. For reference, the dashed line shows the modulation pattern for which the maximum value of the second anode duty ratio is 70% where duration that the second electrode 16 works as an anode is longest.

As shown in FIG. 9, by alternately repeating the section period DP1 for which the first electrode 15 anode duty ratio is greater than or equal to 50%, and the section period DP2 for which the first electrode 15 anode duty ratio is less than 50%, it is possible to restore the two electrodes in a proper balance while ensuring a sufficient change amount in the anode duty ratio. It is also possible to enlarge changing amount in the duty ratio between two consecutive section periods (hereafter also simply referred to as "duty ratio changing amount").

Note that with the modulation pattern shown in FIG. 9, the duty ratio changing amount gradually increases with the anterior half of the modulation period Tm, and gradually decreases in the posterior half of the modulation period Tm. As the modulation pattern, it is also possible to use various patterns as long as the pattern alternately repeats a section period for which one electrode anode duty ratio is greater than the reference duty ratio (with the example in FIG. 9, 50% which is the rounded value of the median value of the modulation range of the anode duty ratio to a 10% unit), and a section period for which the duty ratio is less than the reference duty ratio. For example, it is possible to use a modulation pattern that alternately repeats a section period for which the first anode duty ratio is 70%, and a section period for which the first anode duty ratio is 40%. However, since it is possible to more effectively suppress convection flow AF being located inside the discharge lamp 1, it is desirable to change the duty ratio changing amount within the modulation cycle Tm as shown in FIG. 9. Note that with the example in FIG. 9, the reference duty ratio is a rounded value (50%) of the median value of the modulation range, but the reference duty ratio may also be the median value of the modulation range itself (52.5%). Generally, the reference duty ratio is acceptable as long as it is predetermined based on the median value of the modulation range. The reference duty ratio may be suitably set in accordance with the discharge lamp 1 characteristics, the length of each section period, the waveform of the alternating current or the like.

Figure 10A:
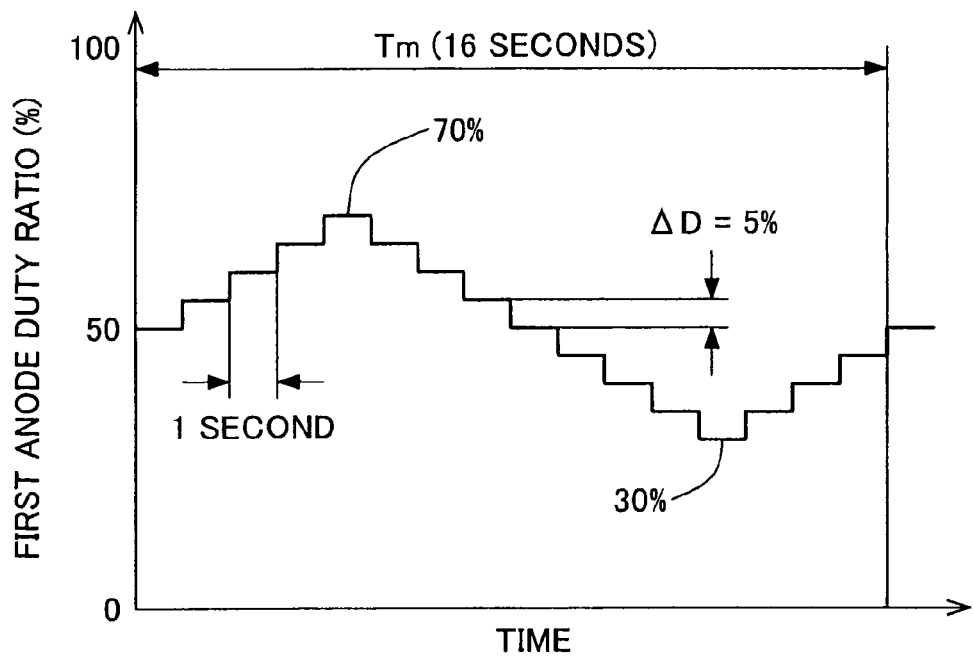
FIG. 10A shows a modulation pattern of alternating current when the duty ratio changing amount is set to 5%.
Figure 10B:
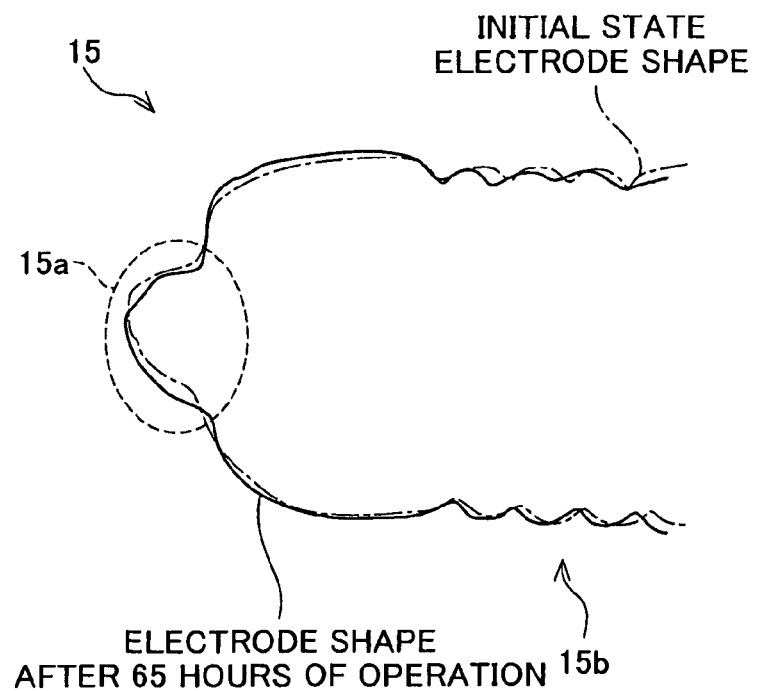
FIG. 10B shows changing of the shape of the first electrode when the duty ratio changing amount is set to 5%.
Figure 11A:
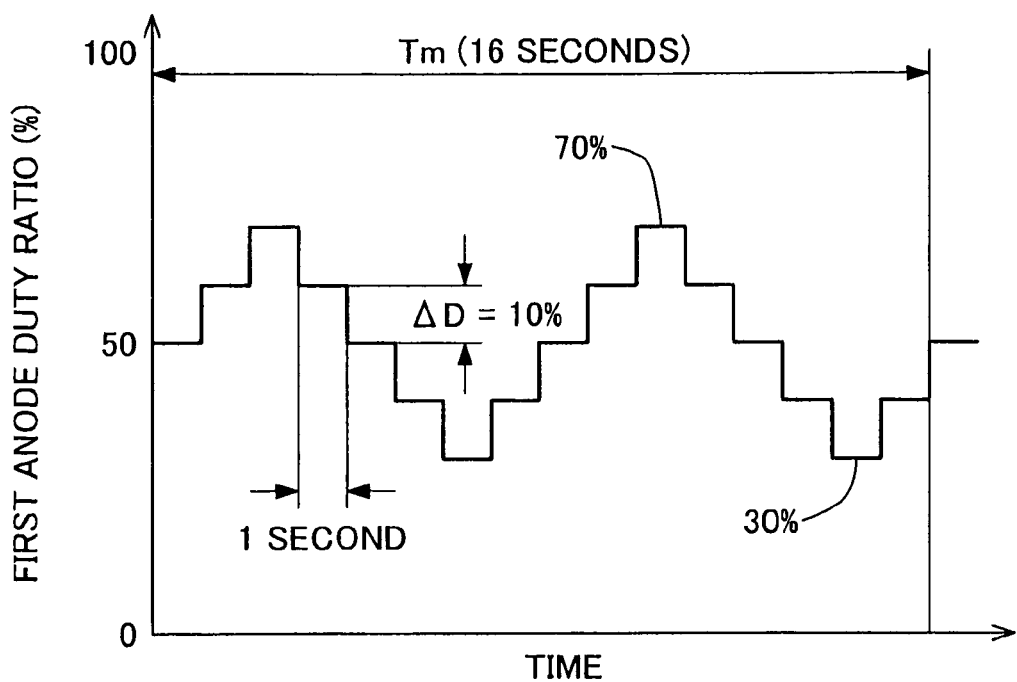
FIG. 11A shows a modulation pattern of alternating current when the duty ratio changing amount is set to 10%.
Figure 11B:
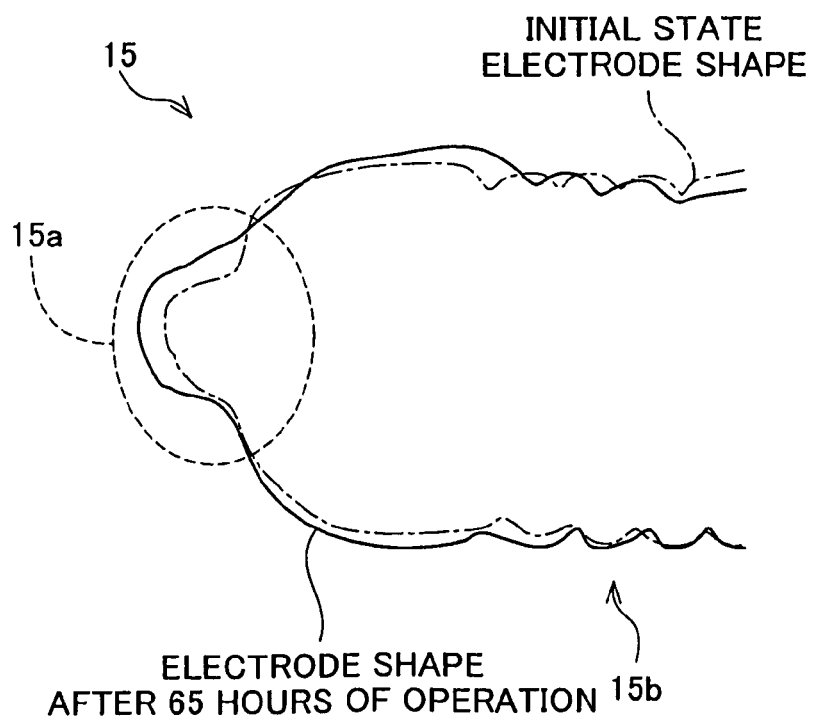
FIG. 11B shows changing of the shape of the first electrode when the duty ratio changing amount is set to 10%.
Figure 12A:
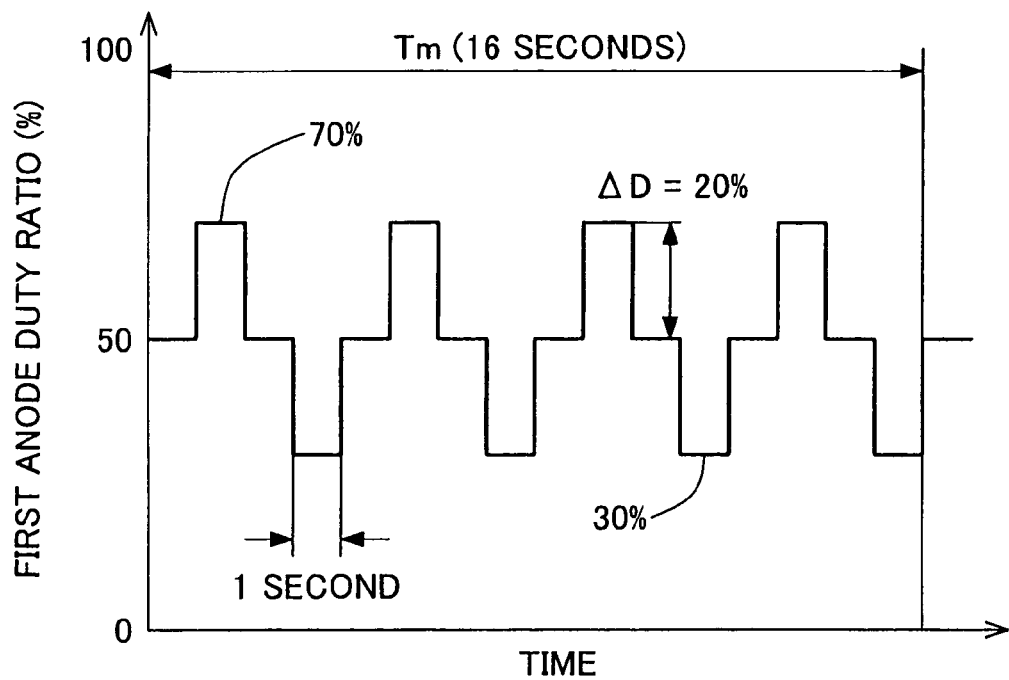
FIG. 12A shows a modulation pattern of alternating current when the duty ratio changing amount is set to 20%.
Figure 12B:
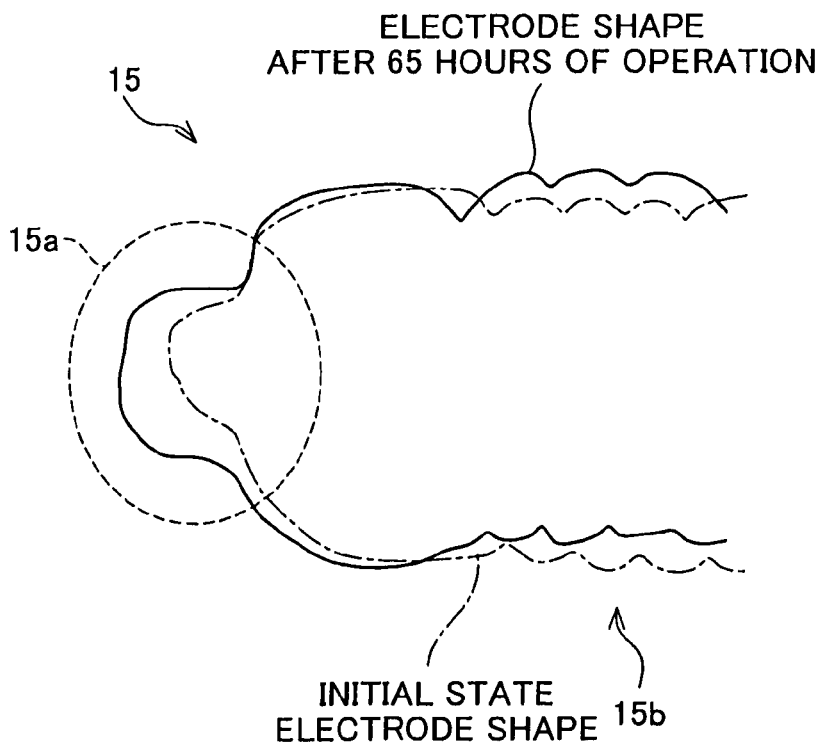
FIG. 12B shows changing of the shape of the first electrode when the duty ratio changing amount is set to 20%.

FIG. 10A through FIG. 12B are explanatory drawings showing the effect of the duty ratio changing amount on the tip 15*a* of the electrode 15 on which the sub-mirror 3 is not provided. FIG. 10A, FIG. 11A, and FIG. 12A show modulation patterns of alternating current when the duty ratio changing amount $\Delta D$ is set to 5%, 10%, and 20% respectively. The horizontal axis of each of these graphs represents time, and the vertical axis represents the alternating current duty ratio. FIG. 10B, FIG. 11B, and FIG. 12B show changing of the shape of the tip 15*a* and the large-diameter portion 15*b* of the electrode 15 when the modulation patterns shown in FIG. 10A, FIG. 11A, and FIG. 12A were used, respectively. In FIG. 10B, FIG. 11B, and FIG. 12B, the solid line indicates the electrode shape after the discharge lamp 1 was operated for 65 hours, and the dot-dash line indicates the electrode shape in a state when the discharge lamp 1 was unused.

As shown in FIG. 10B, when the modulation pattern shown in FIG. 10A was used, specifically, when the duty ratio changing amount $\Delta D$ was 5%, the size of the tip 15*a* of the electrode surrounded by the dotted line was almost the same as the unused state (dot-dash line). As shown in FIG. 11B, when the duty ratio changing amount $\Delta D$ was 10% (FIG. 11A), the size of the tip 15*a* of the electrode surrounded by the dotted line was larger than when the duty ratio changing amount $\Delta D$ was 5%. Furthermore, when the duty ratio changing amount $\Delta D$ was 20% (FIG. 12A), the size of the tip 15*a* of the electrode surrounded by the dotted line was even larger than when the duty ratio changing amount $\Delta D$ was 10%. In this way, the size of the tip 15*a* of the first electrode after the discharge lamp 1 was operated became larger in accordance with the duty ratio changing amount $\Delta D$ becoming larger.

As shown in FIG. 10A through FIG. 12B, as the duty ratio changing amount $\Delta D$ became larger, the tip 15*a* of the electrode 15 grew even larger with operation. From this result, by making the duty ratio changing amount $\Delta D$ greater than a specified value (e.g. 7.5%), the tip 15*a* grows with operation, and we found that it is possible to suppress the flattening of the tip 15*a*. Note that for the second electrode 16 as well, similar to the first electrode 15, by making the duty ratio change volume $\Delta D$ greater, the tip 16*a* grows with operation, and it is possible to suppress flattening of the tip 16*a*.

With the second embodiment, by alternately repeating the section period DP1 for which the first electrode 15 anode duty ratio is greater than or equal to 50% where the first electrode 15 anode period is relatively long, and the section period DP2 for which the first electrode 15 anode duty ratio is less than 50% where the second electrode 16 anode period is relatively long, the duty ratio changing amount is made larger. Because of this, with the second embodiment, it is possible to grow the tips 15a and 16a with operation, and it is possible to suppress degradation of the electrode shape such as flattening of the tips 15a and 16a or the like.

Third Embodiment

Following, the light source device of the third embodiment will be described. Note that the light source device of the third embodiment is a variation of the light source device 100 of the first embodiment, and parts not specifically described are the same as the light source device 100 of the first embodiment.

Figure 13:
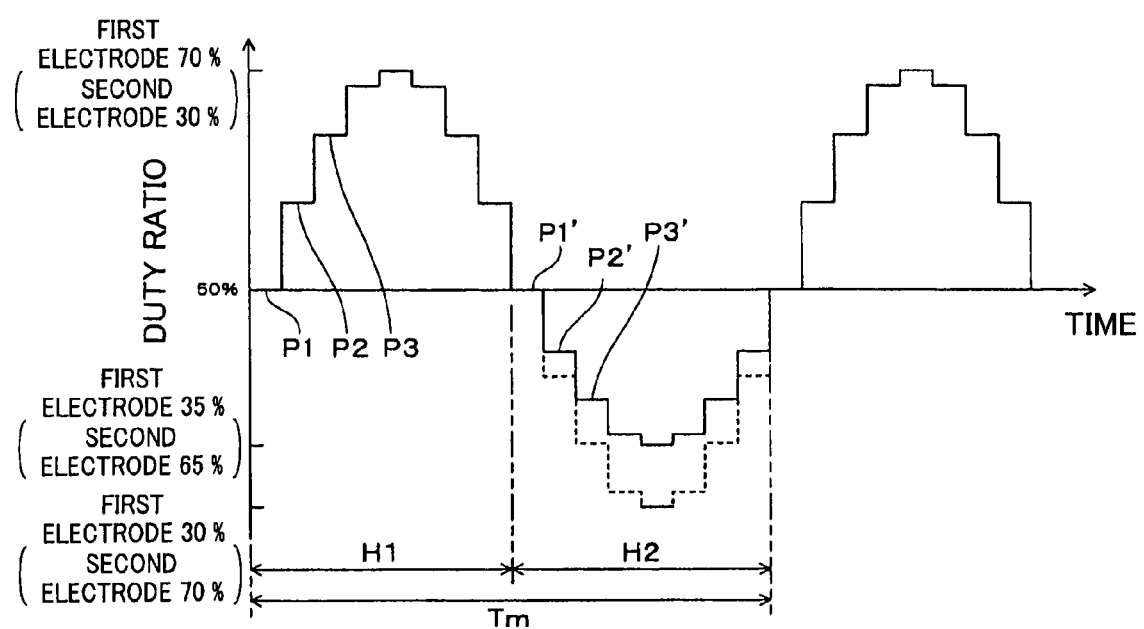
FIG. 13 is a graph for describing the modulation of the duty ratio of the alternating current in the third embodiment.

FIG. 13 is a graph for describing the modulation of the duty ratio of the alternating current supplied to the pair of electrodes 15 and 16. The horizontal axis represents time, and the vertical axis represents the duty ratio. In this case, as shown by the solid line, the modulation pattern of the alternating current supplied to both electrodes 15 and 16 consists of the anterior half period H1 for which the first anode duty ratio is greater than or equal to 50% where the anode period of the first electrode 15 is relatively long, and the posterior half period H2 for which the first anode duty ratio is less than or equal to 50% where the anode period of the second electrode 16 is relatively long. The modulation pattern of the third embodiment differs from the modulation pattern shown in FIG. 4 that the duty ratio uniformly increases and decreases in that the changing amount of the duty ratio changes in time. For reference, the dashed line shows the modulation pattern for which the maximum value of the second anode duty ratio is 70% where duration that the second electrode 16 works as an anode is longest.

With the third embodiment as well, both of the duty ratio changing amount between the section periods P1 and P2, and the duty ratio changing amount between the section periods P1' and P2' become larger. Because of this, the same as with the second embodiment, it is possible to grow the tips 15a and 16a with operation, and it is possible to suppress degradation of the electrode shape such as flattening of the tips 15a and 16a.

Variation of Modulation Pattern

The modulation patterns shown in FIG. 4, FIG. 9, and FIG. 13 are only examples, and by changing the alternating current supplied to the pair of electrodes 15 and 16 using various modulation patterns, it is possible to prevent excessive localization of convection flow AF inside the discharge lamp 1. Also, as shown in FIG. 9 and FIG. 13, by making the duty ratio changing amount greater than a specified value, it is possible to suppress degradation of the electrode shape. For example, it is also possible to change the alternating current using the following modulation patterns.

First Variation

Figure 14:
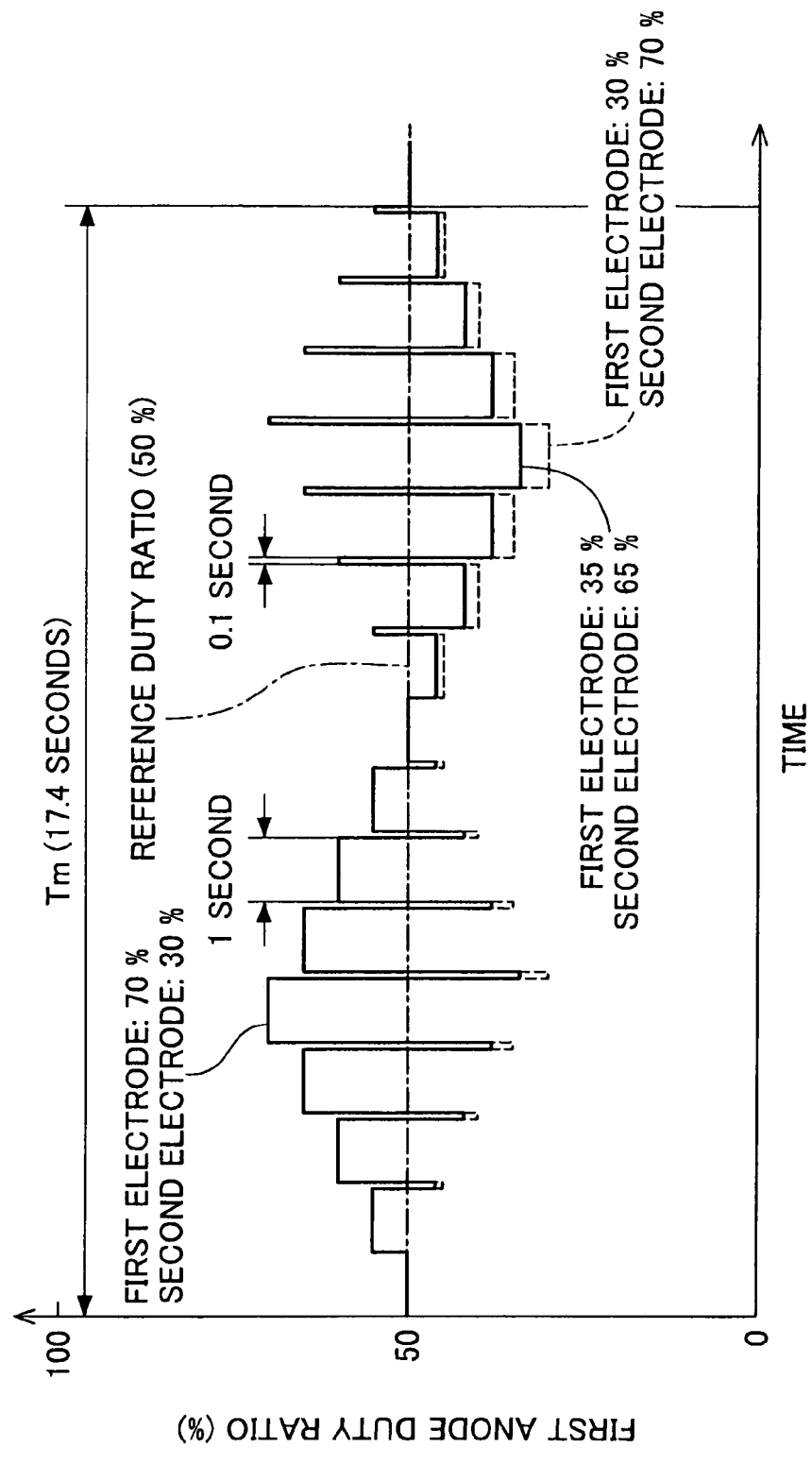
FIG. 14 is an explanatory drawing showing a first variation of the modulation pattern.

FIG. 14 is an explanatory drawing showing a first variation of the modulation pattern. With the modulation pattern of the first variation, in the anterior half of the modulation cycle Tm, the period for which the first electrode 15 anode duty ratio is less than (low duty ratio period) the reference duty ratio (50%) is shortened, and in the posterior half of the modulation cycle Tm, the period for which the anode duty ratio exceeds the reference duty ratio (high duty ratio period) is shortened. The other points are the same as the modulation pattern of the second embodiment shown in FIG. 9.

In a state for which the anode duty ratio of one electrode is high, the temperature of that electrode rises. In this way, in a state when the temperature rises, when the electrode operates as a negative electrode, there is a large amount of emission (sputter) of electrode material into the discharge space 12 due to collision of positive ions (e.g. Ar+ or Hg+) generated by discharge, and it is easy for blackening of the inner wall of the discharge space 12 to occur. In light of this, with the first variation, at the anterior half of the modulation cycle Tm where the temperature of the first electrode 15 rises, the low duty ratio period is shortened thereby suppressing the occurrence of sputter, and at the posterior half of the modulation cycle Tm where the temperature of the second electrode 16 rises, the high duty ratio period is shortened thereby suppressing the occurrence of sputter.

Meanwhile, even with the first variation, by alternately repeating the section period for which the anode duty ratio of the first electrode 15 is greater than or equal to 50% where the first electrode 15 anode period is relatively long, and the section period for which the anode duty ratio of the first electrode 15 is less than or equal to 50% where the second electrode 16 anode period is relatively long, the duty ratio changing amount becomes greater. Because of this, it is possible to grow the tips 15a and 16a with operation, and it is possible to suppress degradation of the electrode shape such as flattening of the tips 15a and 16a and the like.

Second Variation

Figure 15:
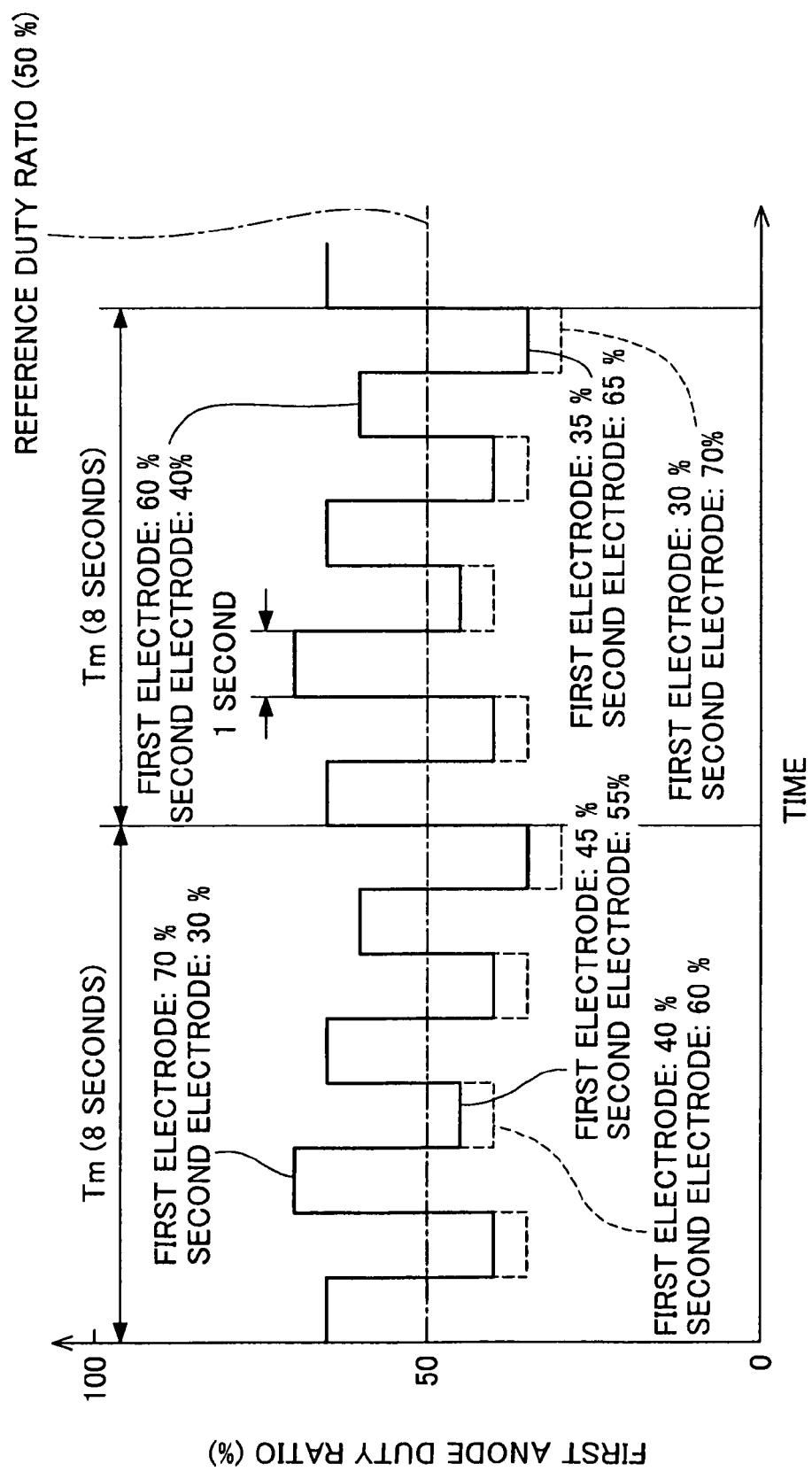
FIG. 15 is an explanatory drawing showing a second variation of the modulation pattern.

FIG. 15 is an explanatory drawing showing a second variation of the modulation pattern. With the modulation pattern of the second variation, the changing amount of the duty ratio from the high duty ratio period of the first electrode 15 to the low duty ratio period following the concerned high duty ratio period is a fixed value (with the example in FIG. 15, 25%), and overall, the duty ratio changes gradually with the modulation cycle Tm (8 seconds). Note that in FIG. 15 as well, the modulation pattern of a maximum value of the second anode duty ratio of 70% is shown by a dotted line. In this case, the change volume of the duty ratio from the high duty ratio period to the low duty ratio period following the concerned high duty ratio period is set to 30%.

As shown in FIG. 15, with the second variation as well, the duty ratio changing amount is sufficiently large, so the tips 15a and 16a grow with operation, and degradation of the electrode shape such as flattening of the tips 15a and 16a is suppressed. Also, it is possible to gradually fluctuate the heat state of both electrodes 15 and 16 and their vicinity with a long span so as to affect the convection flow AF. Thus, formation of a steady convection flow AF inside the tube body 11 of the discharge lamp 1 may be avoided.

Modifications

The present invention is not limited to the examples and embodiments described above and may be reduced to practice in various forms without departing the scope thereof including, for example, the following modifications.

As the lamp of the light source unit 10 in the embodiments described above, various lamp such as a high pressure mercury lamp, a metal halide lamp or the like may be used.

In the projector 200 of the embodiments described above, a pair of fly eye lenses 23a and 23b for dividing the light from the light source device 100 into a plurality of partial light flux is used, but this invention can also be used for a projector that does not use this kind of fly eye lens, i.e. lens array. Furthermore, it is also possible to replace the fly eye lenses 23a and 23b with a rod integrator.

In the aforementioned projector 200, a polarization conversion component 24 that polarizes the light from the light source device 100 to a specific direction is used, but this invention may also be applied to a projector that does not use this kind of polarization conversion component 24.

In the embodiments described above, an example is described where the present invention is applied to a transmission type projector, but it is also possible to apply the present invention to a reflective type projector. Here, the "transmission type" means that the projector is equipped with a liquid crystal light valve including a liquid crystal panel which transmits light. The "reflective type" means that the projector is equipped with a liquid crystal light valve which reflects light. Note that the light modulation device is not limited to a liquid crystal panel. For example, a light modulation device with a micro mirror may also be used.

As the projector, there are a front side projector that projects image projection from the direction observing the projection surface, and a back side projector that projects image from the opposite side from the direction observing the projection surface. The configuration of the projector shown in FIG. 8 may be applied to either of these projectors.

In the embodiments described above, only an example of a projector 200 using three liquid crystal panels 41a through 41c is presented. The present invention may also be applied to a projector using only one liquid crystal panel, a projector using two liquid crystal panels, or a projector using four or more liquid crystal panels.

In the embodiments described above, each color light is modulated using the color separation optical system 30 and the liquid crystal light valves 40a, 40b, and 40c. It is also possible to perform color light modulation and synthesis instead of this. For example, modulation and synthesis of the color lights may be performed by combining a color wheel illuminated by the light source device 100 and the illumination optical system 20, and a device equipped with micro mirror pixels for which transmitted light of the color wheel is radiated.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A light source device comprising:
   a discharge lamp that emits light by discharge in an interelectrode space between a first electrode and a second electrode;
   a main mirror arranged at a side of the first electrode that reflects light flux generated by the discharge in the interelectrode space so as to emit the light flux to an area to be illuminated;
   a sub-mirror arranged at a side of the second electrode facing opposite the main mirror that reflects the light flux from the interelectrode space toward the interelectrode space; and
   a driver that supplies alternating current to the first and the second electrodes, and changes duty ratio of the alternating current supplied to the first and the second electrodes in accordance with a predetermined pattern,
   wherein maximum value of duty ratio of a first anode period in which the first electrode works as anode to one cycle of the alternating current is larger than maximum value of duty ratio of a second anode period in which the second electrode works as anode to the one cycle of the alternating current.

2. The light source device according to claim 1 wherein the one cycle of the alternating current includes a positive polarity period and a negative polarity period for which current value is positive and negative respectively, and the driver varies the current value during a longer polarity period among the positive and the negative polarity periods, time ratio of the longer polarity period to the one cycle of the alternating current being at least 50.

3. The light source device according to claim 2 wherein the driver varies the current value during the longer polarity period so that the current value is at a maximum at an end of the longer polarity period.

4. The light source device according to claim 3 wherein the driver increases the current value during the longer polarity period together with time.

5. The light source device according to claim 1 wherein the predetermined pattern includes a first section period and a second section period following the first section period as a section period in which the duty ratio of the alternating current is maintained at a predetermined value, the duty ratio during the first section period and the duty ratio during the second section period are mutually different, and
   the difference between the duty ratio in the first section period and the second section period is greater than a predetermined value.

6. The light source device according to claim 5 wherein the duty ratio in the first section period and the duty ratio in the second section period are changed so as to extend across a reference duty ratio determined in accordance with a median value of a changing range of the duty ratio.

7. The light source device according to claim 6 wherein length of the first section period and length of the second section period are mutually different.

8. The light source device according to claim 7 wherein the predetermined pattern is a pattern that cyclically changes,
   in a specified period within one cycle of the pattern, a section period for which the duty ratio is higher than the reference duty ratio is longer than a section period for which the duty ratio is lower than the reference duty ratio, and
   in a remaining period within the one cycle of the pattern, a section period for which the duty ratio is higher than the reference duty ratio is shorter than a section period for which the duty ratio is lower than the reference duty ratio.

9. A projector comprising:
   a discharge lamp that emits light by discharge in an interelectrode space between a first electrode and a second electrode;
   a main mirror arranged at a side of the first electrode that reflects light flux generated by the discharge in the interelectrode space so as to emit the light flux to an area to be illuminated;
   a sub-mirror arranged at a side of the second electrode facing opposite the main mirror that reflects the light flux from the interelectrode space toward the interelectrode space;
   a driver that supplies alternating current to the first and the second electrodes, and changes duty ratio of the alternating current supplied to the first and the second electrodes in accordance with a predetermined pattern;
   a light modulating device illuminated by illumination light from the discharge lamp; and
   a projection optical system that projects image formed by the light modulating device,
   wherein maximum value of duty ratio of a first anode period in which the first electrode works as anode to one cycle of the alternating current is larger than maximum value of duty ratio of a second anode period in which the second electrode works as anode to the one cycle of the alternating current.

10. A driving method of a discharge lamp that emits light by discharge in an interelectrode space between a first electrode and a second electrode, the discharge lamp having a main mirror arranged at a side of the first electrode that reflects light flux generated by the discharge in the interelectrode space so as to emit the light flux to an area to be illuminated, and a sub-mirror arranged at a side of the second electrode facing opposite the main mirror that reflects the light flux from the interelectrode space toward the interelectrode space, the driving method of the discharge lamp comprising;

supplying alternating current to the first and the second electrodes; and changing duty ratio of the alternating current supplied to the first and the second electrodes in accordance with a predetermined pattern, wherein maximum value of duty ratio of a first anode period in which the first electrode works as anode to one cycle of the alternating current is larger than maximum value of duty ratio of a second anode period in which the second electrode works as anode to the one cycle of the alternating current.

* * * * *